(12) United States Patent
Esmailzadeh et al.

(10) Patent No.: US 11,972,000 B2
(45) Date of Patent: Apr. 30, 2024

(54) INFORMATION DISPERSAL FOR SECURE DATA STORAGE

(71) Applicant: Arash Esmailzadeh, Los Angeles, CA (US)

(72) Inventors: Arash Esmailzadeh, Los Angeles, CA (US); Andrew Vogan, Penn Laird, VA (US)

(73) Assignee: Arash Esmailzadeh, Los Angeles, CA (US)

(*) Notice: Subject to any disclaimer, the term of this patent is extended or adjusted under 35 U.S.C. 154(b) by 361 days.

(21) Appl. No.: 17/395,661

(22) Filed: Aug. 6, 2021

(65) Prior Publication Data

US 2023/0043589 A1 Feb. 9, 2023

(51) Int. Cl.
*G06F 21/62* (2013.01)
*G06F 21/60* (2013.01)
*H04L 9/08* (2006.01)

(52) U.S. Cl.
CPC ........ *G06F 21/602* (2013.01); *G06F 21/6245* (2013.01); *H04L 9/085* (2013.01)

(58) Field of Classification Search
CPC .............................. G06F 21/6245; H04L 9/085
See application file for complete search history.

(56) References Cited

U.S. PATENT DOCUMENTS

| 8,166,406 | B1 | 4/2012 | Goldfeder et al. |
| 8,776,169 | B2 | 7/2014 | Rajagopal et al. |
| 8,793,509 | B1 | 7/2014 | Nelson et al. |
| 8,881,227 | B2 | 11/2014 | Rajagopal et al. |
| 9,137,319 | B2 | 9/2015 | Xu et al. |
| 9,258,136 | B2 | 2/2016 | Verschoor et al. |
| 2004/0043758 | A1 | 3/2004 | Sorvari et al. |
| 2007/0036353 | A1 | 2/2007 | Reznik et al. |
| 2009/0106561 | A1 | 4/2009 | Ejiri |
| 2010/0266120 | A1* | 10/2010 | Leggette ............... H04L 63/045 714/799 |
| 2010/0274910 | A1 | 10/2010 | Ghanaie-Sichanie et al. |
| 2011/0126295 | A1* | 5/2011 | Resch .................. G06F 16/215 726/27 |
| 2011/0289565 | A1 | 11/2011 | Resch et al. |

(Continued)

OTHER PUBLICATIONS

Kurihara et al. "A New (k, n)-Threshold Secret Sharing Scheme and Its Extension★" Cryptology ePrint Archive, Paper 2008/409 (Year: 2008).*

(Continued)

*Primary Examiner* — David J Pearson
(74) *Attorney, Agent, or Firm* — Kilpatrick Townsend & Stockton LLP

(57) ABSTRACT

A method of securely dispersing private user data may include operating a software application configured to utilize user data, receiving the user data, generating a sequence of random bits, and generating a plurality of secret shares from the user data. Generating the plurality of secret shares may include selecting a subset of the user data for each secret share and combining the subset of the user data with the sequence of random bits. The subset of the user data may be a first half of the user data for a first secret share, a second half of the user data for a second secret share, and the whole user data for a third secret share. The method may also include dispersing each of the secret shares.

20 Claims, 16 Drawing Sheets

(56) References Cited

U.S. PATENT DOCUMENTS

| | | | |
|---|---|---|---|
| 2012/0023547 | A1 | 1/2012 | Maxson et al. |
| 2012/0240237 | A1 | 9/2012 | Kanevsky et al. |
| 2012/0304286 | A1 | 11/2012 | Croll et al. |
| 2013/0054803 | A1 | 2/2013 | Shepard et al. |
| 2013/0238900 | A1 | 9/2013 | Leggette et al. |
| 2013/0268357 | A1 | 10/2013 | Heath |
| 2013/0325823 | A1 | 12/2013 | Resch et al. |
| 2013/0340028 | A1 | 12/2013 | Rajagopal et al. |
| 2013/0340086 | A1 | 12/2013 | Blom |
| 2014/0214919 | A1 | 7/2014 | Taylor et al. |
| 2014/0282852 | A1 | 9/2014 | Vestevich |
| 2014/0297635 | A1 | 10/2014 | Orduna et al. |
| 2014/0351891 | A1 | 11/2014 | Grube et al. |
| 2015/0082455 | A1 | 3/2015 | Jalili |
| 2015/0088777 | A1 | 3/2015 | Chauhan et al. |
| 2016/0092699 | A1 | 3/2016 | Riva et al. |
| 2016/0148006 | A1 | 5/2016 | Ganapathi et al. |
| 2019/0109711 | A1* | 4/2019 | Gladwin ............... H04L 9/0869 |
| 2020/0153614 | A1 | 5/2020 | Srinivasan |
| 2021/0266150 | A1* | 8/2021 | Ornelas ................... G06F 8/61 |
| 2022/0103533 | A1* | 3/2022 | Srinivasan ............. H04L 63/02 |

OTHER PUBLICATIONS

Mar et al. "Securing Cloud Data using Information Dispersal" 2016 14th Annual Conference on Privacy, Security and Trust (PST) (Year: 2016).*

Yao et al. "A Secure and Efficient Distributed Storage Scheme SAONT-RS Based on an Improved AONT and Erasure Coding" IEEE Access ( vol. 6) (Year: 2018).*

Fredrikson et al., "REPRIV: Re-Imagining Content Personalization and In-Browser Privacy," IEEE, May 22-25, 2011, pp. 131-146.

Li, M., "On the Confidentiality of Information Dispersal Algorithms and Their Erasure Codes," Department of Computer Science and Engineering, The Chinese University of Hong Kong, arXiv:1206.4123v2 [cs.IT] Mar. 13, 2013, 4 pages.

Lv et al., "Efficient Ideal Threshold Secret Sharing Schemes Based on Exclusive-OR Operations," 2010 Fourth International Conference on Network and Systems Security, Doi 10.1109/NSS.2010.82, 8 pages.

Tan et al., Robust visual secret sharing scheme applying to QR code, Security and Communication Networks, 2018 [online], [retrieved on Nov. 22, 2022]. Retrieved from the Internet <URL: https://downloads.hindawi.com/journals/scn/2018/4036815.pdf>, entire document, especially p. 3 col. 2 para 2.

Toyoda et al., Secret sharing based unidirectional key distribution with dummy tags in Gen2v2 RFID-enabled supply chains, 2015 IEEE International Conference on RFID (RFID), 2015, pp. 63-69 [online], [retrieved on Nov. 22, 2022]. Retrieved from the Internet <URL: https://www.researchgate.net/profile/Kentaroh-Toyoda/publication/278668835_Secret_Sharing_Based_Unidirectional_Key_Distribution_with_Dummy_Tags_in_Gen2v2_RFID-enabled_Supply_Chains/links/5bf5f87c4585150b2bc8ca46/Secret-Sharing-Based-Unidirectional-Key-Distribution-with-Dummy-Tags-in-Gen2v2-RFID-enabled-Supply-Chains.pdf>, entire document, especially p. 84 col. 2 para 4.

Wang et al., Two secret sharing schemes based on Boolean operations, Pattern Recognition, 40(10), 2007, pp. 2776-2785 [online], [retrieved on Nov. 22, 2022]. Retrieved from the Internet <URL: https://citeseerx.ist.psu.edu/document?repid=rep1&type=pdf&doi=264a666876f236e168fe6e8cde5d2247844a228c>, entire document, especially p. 2781 col. 1 para 3, p. 2781 col. 2 para 1.

Weinberg et al., "I Still Know What You Visited Last Summer: Leaking browsing history via user interaction and side channel attacks," 2011 IEEE Symposium on Security and Privacy, pp. 147-161.

Wikipedia, "Shamir's secret sharing" last edited May 21, 2023, 7 pages.

International Search Report and Written Opinion for PCT/US2022/039440 dated Jan. 4, 2023, all pages.

* cited by examiner

US 11,972,000 B2

INFORMATION DISPERSAL FOR SECURE DATA STORAGE

BACKGROUND

The explosive adoption of Internet technologies over the past 20 years is proof enough of how tremendously we value the connectivity the Internet provides. But as online service providers expand their channels of productivity, convenience, and entertainment, their clients' online footprints inevitably grow larger as well. Unlike actual footprints, however, those digital footprints can morph into fingerprints, leaving Internet users wondering about how deeply their privacy has been compromised by their online activities. Whether it's online retailers tracking shopping behavior, data brokers scooping up and selling profile information that has leaked through social media, or the GPS trail so many smart phone users leave as they move about, consumers and businesses alike have every reason to be concerned about the percolation and collection of their private information through the Internet.

These concerns will only grow—probably exponentially—as service providers inexorably seek to realize the competitive edge that big data analytics promises. For example, life insurance companies are using the big data aggregated in records of applicants' online behavior to gauge life expectancy. After one online reservation broker discovered that the average Mac® user spends more on hotels than the typical PC user, it began steering the Mac® users toward pricier lodgings. Breaches of users' privacy such as these, regardless of whether the damage involved was more imagined or real, spark real recriminations against the providers who minimize the value that users place on privacy.

Between 2009 and 2013, the percentage of Internet users who said they worry about the availability of information about them online them rose from 33% to 50%, according to the Pew Research Center. Pew also reported that nearly 90% of the people they surveyed have tried at least one way, such as clearing tracking cookies or their browser history, to prevent online tracking, and almost 70% said that the law is not doing enough to protect their privacy. As for identity theft, 2013 marked the 14th consecutive year in which that crime was the number-one consumer complaint in the United States, according the Federal Trade Commission.

Even if most users' concerns over Internet privacy are primarily a matter of principle, for victims of crime and political dissidents it can be a matter of life or death. For whistleblowers, it can be a matter of continuing to earn a living. And for businesses, it can be a matter of relying on the Internet to communicate trade secrets. The demand for online privacy has been with us since the 1990s, and it will continue to grow as our dependence on the Internet, and the data sets accessible through it, grows.

BRIEF SUMMARY

In some embodiments, a method of securely dispersing private user data into secret shares may include operating a software application configured to utilize user data, receiving the user data comprising a plurality of bytes, generating a sequence of random bits, and generating a plurality of secret shares from the user data. The plurality of secret shares may comprise a first secret share, a second secret share, and a third secret share. The method may also include selecting a subset of bits from each byte of the plurality of bytes based on the secret share being generated, thereby creating a subset of the user data. The selected subset of bits may be the same for each byte of the plurality of bytes. The method may also include selecting a first bit, a second bit, a third bit, and a fourth bit for the first secret share, selecting a fifth bit, a sixth bit, a seventh bit, and an eighth bit for the second secret share, and selecting the first bit, the second bit, the fifth bit, the sixth bit, the seventh bit, the eighth bit, the third bit, and the fourth bit for the third secret share. The method may also include combining the subset of the user data with the sequence of random bits for each of the plurality of secret shares. The method may also include dispersing each secret share of the plurality of secret shares.

In some embodiments, each byte of 8 bits is indexed from 0 to 7, wherein the first bit is the bit at index 4; the second bit is the bit at index 1; the third bit is the bit at index 6; the fourth bit is the bit at index 3; the fifth bit is the bit at index 0; the sixth bit is the bit at index 5; the seventh bit is the bit at index 2; and the eighth bit is the bit at index 7. In some embodiments, combining the subset of the user data with the sequence of random bits comprises: selecting, for each byte of the user data, a byte of the sequence of random bits, each byte of the sequence of random bits having a middle four bits and an outside four bits that do not overlap; and generating an output byte. Generating the output byte may comprise: determining, for the first secret share, the result of the exclusive disjunction between the subset of bits and the middle four bits of the byte of the sequence of random bits; determining, for the second secret share, the result of the exclusive disjunction between the subset of bits and the outside four bits of the byte of the sequence of random bits; and determining for the third secret share, the result of the exclusive disjunction between the subset of bits and the byte of the sequence of random bits.

In some embodiments, generating the sequence of random bits comprises: determining that the user data is represented by a first number of bits; and generating a second number of random bits, the second number of random bits being greater than or equal to the first number of bits. In some embodiments, a minimum number of secret shares is required to reassemble the user data, the minimum number of secret shares being less than the generated plurality of secret shares and more than one secret share. The plurality of secret shares may comprise three secret shares and the minimum number of secret shares may comprise two secret shares. In some embodiments, the plurality of secret shares is based on a first input received by the computing device and the minimum number of secret shares is based on a second input received by the computing device.

The method may also include generating, by the computing device, the user data using a subset of the generated plurality of secret shares. Generating the user data may comprise: combining the first secret share with the second secret share; combining the first secret share with the third secret share; or combining the second secret share with the third secret share. Combining the first secret share with the second secret share may comprises: generating, from the exclusive disjunction between the first secret share and the second secret share, an intermediate sequence of bits, the intermediate sequence of bits comprising bytes of bits indexed from 0 to 7; and generating, for each byte of the intermediate sequence of bits, a restored byte such that the intermediate bit at index 0 of the byte is at index 0 of the restored byte, the intermediate bit at index 3 of the byte is at index 1 of the restored byte, the intermediate bit at index 6 of the byte is at index 2 of the restored byte, the intermediate bit at index 5 of the byte is at index 3 of the restored byte, the intermediate bit at index 2 of the byte is at index 4 of the restored byte, the intermediate bit at index 1 of the byte is at index 5 of the restored byte, the intermediate bit at index 4 of the byte is at index 6 of the restored byte, and the intermediate bit at index 7 of the byte is at index 7 of the restored byte. Combining the first secret share with the third secret share may comprise: generating, from the exclusive disjunction between the first secret share and the third secret share, a first preliminary sequence of bits, the first preliminary sequence of bits comprising bytes of bits indexed from 0 to 7; generating, a second preliminary sequence of bits, wherein the second preliminary sequence of bits comprises a zero at indexes 0 through 1 and 6 through 7, the bits at indexes 0 through 1 of the first preliminary sequence of bits at indexes 2 through 3 respectively, and the bits at indexes 6 through 7 of the first preliminary sequence of bits at indexes 4 through 5 respectively; generating, from the exclusive disjunction between the first preliminary sequence of bits and the second preliminary sequence of bits, an intermediate sequence of bits, the intermediate sequence of bits indexed from 0 to 7; and generating, for each byte of the intermediate sequence of bits, a restored byte such that the intermediate bit at index 2 of the byte is at index 0 of the restored byte, the intermediate bit at index 1 of the byte is at index 1 of the restored byte, the intermediate bit at index 4 of the byte is at index 2 of the restored byte, the intermediate bit at index 7 of the byte is at index 3 of the restored byte, the intermediate bit at index 0 of the byte is at index 4 of the restored byte, the intermediate bit at index 3 of the byte is at index 5 of the restored byte, the intermediate bit at index 6 of the byte is at index 6 of the restored byte, and the intermediate bit at index 5 of the byte is at index 7 of the restored byte. Combining the second secret share with the third secret share may comprise: generating, from the exclusive disjunction between the second secret share and the third secret share, a first preliminary sequence of bits, the first preliminary sequence of bits comprising bytes of bits indexed from 0 to 7; generating, a second preliminary sequence of bits, wherein the second preliminary sequence of bits comprises a zero at indexes 2 through 5 of each byte, and the bits at indexes 2 through 5 of each byte of the first preliminary sequence of bits at indexes 0 through 1 and 6 through 7 respectively; generating, from the exclusive disjunction between the first preliminary sequence of bits and the second preliminary sequence of bits, an intermediate sequence of bits, the intermediate sequence of bits indexed from 0 to 7; and generating, for each byte of the intermediate sequence of bits, a restored byte such that the intermediate bit at index 2 of the byte is at index 0 of the restored byte, the intermediate bit at index 1 of the byte is at index 1 of the restored byte, the intermediate bit at index 4 of the byte is at index 2 of the restored byte, the intermediate bit at index 7 of the byte is at index 3 of the restored byte, the intermediate bit at index 0 of the byte is at index 4 of the restored byte, the intermediate bit at index 3 of the byte is at index 5 of the restored byte, the intermediate bit at index 6 of the byte is at index 6 of the restored byte, and the intermediate bit at index 5 of the byte is at index 7 of the restored byte.

The method may also include encrypting, after receiving the user data and before generating the plurality of secret shares, the user data using an end-to-end encryption mechanism. The method may also include performing, after encrypting the user data and before generating the plurality of secret shares, an all-or-nothing transform on the encrypted user data. The method may also include concatenating, after generating the plurality of secret shares, an authentication code to each secret share of the generated plurality of secret shares.

In some embodiments, dispersing the plurality of secret shares comprises generating a QR code for each secret share of the generated plurality of secret shares, the QR code comprising the secret share. Dispersing the plurality of secret shares may also comprise encoding an RFID tag for each secret share of the generated plurality of secret shares, the RFID tag comprising the secret share.

In some embodiments, a non-transitory computer-readable medium may be presented. The computer-readable medium may comprise a sequence of instructions which, when executed by one or more processors, causes the one or more processors to perform operations including operating a software application configured to utilize user data, receiving the user data, generating a sequence of random bits, and generating a plurality of secret shares from the user data. The plurality of secret shares may comprise a first secret share, a second secret share, and a third secret share. Generating the plurality of secret shares may comprise selecting a subset of the user data based on the secret share being generated. Selecting the subset of the user data may comprise selecting a first half of the user data for the first secret share, selecting a second half of the user data for the second secret share, and selecting all of the user data for the third secret share. Generating the plurality of secret shares may also comprise combining the subset of the user data with the sequence of random bits. The method may also include dispersing each secret share of the plurality of secret shares.

In some embodiments, the user data comprises a plurality of bytes, wherein each byte of 8 bits is indexed from 0 to 7. Selecting a subset of the user data may further comprise selecting a subset of bits from each byte of the plurality of bytes, the selected subset of bits being the same for each byte of the plurality of bytes. Selecting the subset of bits from each byte of the plurality of bytes may comprise: selecting, for the first secret share, the bit at index 4, the bit at index 1, the bit at index 6, and the bit at index 3, in that order; selecting, for the second secret share, the bit at index 0, the bit at index 5, the bit at index 2, and the bit at index 7, in that order; and selecting, for the third secret share, the bit at index 4, the bit at index 1, the bit at index 0, the bit at index 5, the bit at index 2, the bit at index 7, the bit at index 6, and the bit at index 3, in that order.

In some embodiments combining the subset of the user data with the sequence of random bits comprises: selecting, for each byte of the user data, a byte of the sequence of random bits, each random bit of the byte of the sequence of random bits being indexed from 0 to 7; and generating an output byte. Generating the output byte may comprise: determining, for the first secret share, the result of the exclusive disjunction between the subset of bits and the random bits at indexes 2 through 5; determining, for the second secret share, the result of the exclusive disjunction between the subset of bits and the random bits at indexes 0 through 1 and 6 through 7; and determining for the third secret share, the result of the exclusive disjunction between the subset of bits and the random bits.

In some embodiments, another method of securely dispersing private user data into secret shares may include operating a software application configured to utilize user data, receiving the user data, obtaining a sequence of random bits, and generating a plurality of secret shares from the user data. Generating each of the plurality of secret shares may comprise selecting a subset of the user data based on the secret share being generated. The selected subset of user data may be different for each secret share of the plurality of secret shares. Generating each of the plurality of secret shares may further comprise combining the subset of the user data with the sequence of random bits. The method may also include encoding each secret share of the plurality of secret shares as a graphical indicator.

In any of the embodiments described herein, one or more of the following features may be implemented in any combination and without limitation. The method/operations may also include receiving updated user data from the software application, dissecting the updated user data into a plurality of data portions, and sending a data portion from the plurality of data portions to each of a plurality of storage node servers. The method/operations may also include sending a request to a gateway server to authorize storage of the updated user data comprising a size of the updated user data, and receiving an authorization from the gateway server to store the updated user data in the plurality of storage node servers. The method/operations may also include sending the authorization from the gateway server to each of the plurality of storage node servers along with the request to retrieve the user data. The software application may include a search engine interface operating in a web browser on the computing device. The user data may include a search engine history. The software application may include an email client. The user data may include a document index. The method/operations may also include receiving an encrypted set of keys from the plurality of storage node servers, and decrypting the encrypted set of keys, where the encrypted set of keys may be encrypted using a hash of a stored password. The method/operations may also include parsing a document to extract a set of tokens to populate the document index by identifying tokens that distinguish the document from other documents, associating each token in the set of tokens with a document identifier, encrypting each token in the set of tokens using the set of keys, dissecting each encrypted token into a plurality of token portions, and sending each token person to a different one of the plurality of storage node servers. The gateway server may include a gateway of a privacy management system. The method/operations may also include displaying a user interface control comprising a plurality of privacy settings, where the plurality of privacy setting may include a first setting that restricts the software application from accessing the user data, a second setting that limits the software application to accessing the user data during a current active session, and a third setting that allows the software application to access the user data. A setting selected by the user interface control may be specific to the software application, and other settings selected by the user interface may be specific to other software applications.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
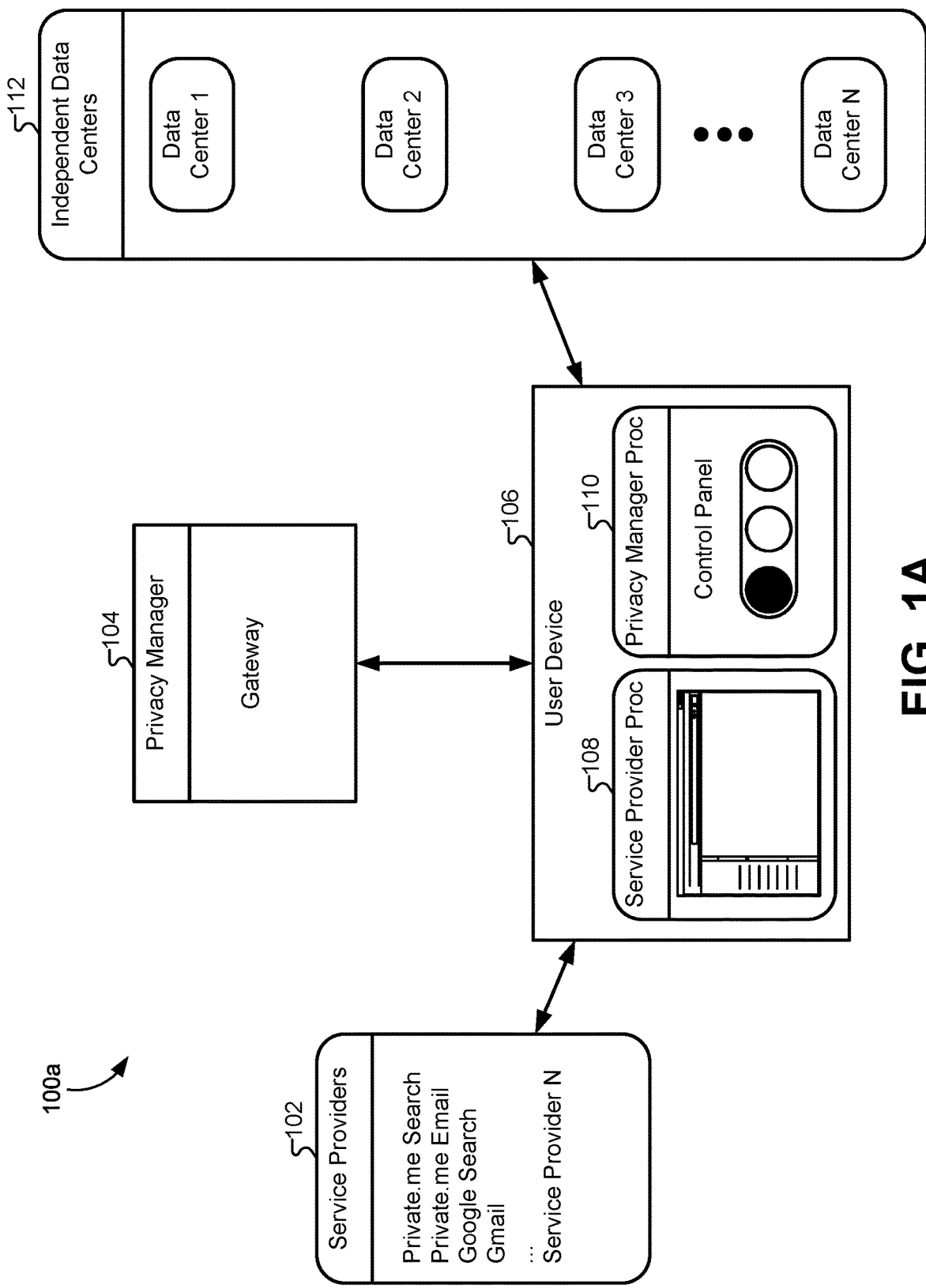
FIG. 1A illustrates a simplified block diagram of a system for securely governing access to user data, according to some embodiments.

Described herein, are embodiments for securely dispersing and storing personal user data. Service providers, such as search engines, email servers, commercial retailers, and so forth, are prevented from storing user information permanently on their sites. Instead, users interact with a privacy manager gateway to manage storage of their personal information. The user device may include a user interface that allows for fine-grained control over access to user data. At the user device, a software application can collect user data, encrypt the user data, and dissect the user data into a plurality of secure data portions. The plurality of secure data portions can then be sent to separate, distinct, and independent data storage nodes and/or distributed to trusted third parties for secure storage. When the user needs access to the user data, plug-ins or other software applications operating on the user device can retrieve the plurality of data portions from the data storage nodes and/or the user can retrieve the distributed data portions from the third parties, reassemble the user data, and temporarily provide the user data to the user.

Given the importance that Internet users give to online privacy, it hardly comes as a surprise that the market of technologies designed to protect that privacy has grown. For online search, users have been turning to alternatives such as DuckDuckGo®, which collects no information on its users and blocks ad trackers. The more tech-savvy consumer may opt for Internet anonymizers and proxy servers to keep their online activities out of the view of prying eyes. Similarly, as more and more high profile sites fall to data leaks, hacks, and ransomware attacks, the need for a trust model that avoids a single point of failure has grown.

Despite the unmet demand for online privacy and the opportunity that this demand has created, the most popular methods currently available to defeat the tracking of one's online activity come at the price of losing valuable historic information, which actually can be handy for many users. With no search history, users have no way of recalling previous searches that proved to be useful. These methods also hobble the artificial-intelligence capabilities of advanced search engines, preventing them from learning how to most rapidly and reliably find the sites most relevant to the user. Some users may want to maintain both their privacy and a point of reference that they can turn to and use. They may want to retain their shopping behavior to receive personalized coupons, or keep search terms to receive more relevant advertisements.

While Internet users are justifiably concerned about online privacy, none of the most widely used consumer technologies today actually give users control over their information. DuckDuckGo® may not record search behavior, but some consumers want a record of their online activity, as noted just above. Moreover, they want authority over that record. They have a sense of ownership regarding their online history. They feel that it rightfully belongs to them, and that they should be the ones to exert control over it in a secure and private environment. People are hesitant to use technology in new and innovative ways because of privacy and security concerns, specifically for electronic health records and online banking.

Facebook®, Google®, and other service providers offer their users some control over the information they collect—for example, by allowing the users to block specific trackers—but even when users choose to deploy all the privacy protection that the providers offer, the providers still store their users' private information on privately owned, centrally networked servers, and maintain 24/7 access to it. Consequently, all that information remains vulnerable to the threat of, for example, a disaffected employee releasing users' information, or to hackers tunneling their way into those servers and then violating the users' privacy in myriad ways.

The problem is that the reigning model of online privacy is the "Fort Knox" paradigm, in which a wall of ever-more complex security measures stands between a centralized vault of valuable data and those who would use that data without authorization. Individuals who can penetrate that wall can use that data according to whatever inclinations they may have.

The embodiments described herein solve these and other problems by not requiring "circling the encryption wagons" around a monolithic digital encampment. Instead, user information, such as online behavior, can be encrypted and divided into multiple packets that are then dispersed across several networks of geographically distributed storage nodes owned not by the service providers, but rather by entities that have a legal disincentive to profit from the data. Alternatively, the multiple packets may be distributed outside of the digital world to trusted individuals in various physical media. Each user is granted exclusive control over access to his/her data, so that a provider is only able to view it and use it only when permitted by the user, such as only when the user is online and using that service. At all other times, the provider would "forget" their clients' private data after it had arrived at the secure, geographically distributed nodes. In terms of online privacy, this scenario is not merely innovative. It completely overturns the paradigm of provider as "protector" of the user's personal data.

In some embodiments, nonprofit organizations, such as mutual benefit corporations, under the laws of California may operate independent storage nodes. The bylaws of such corporations can be written to forbid them from sharing, either among themselves or with third parties, certain information that is stored on their servers, unless authorized by the owners of that information. Additionally, it can be illegal for them to sell their assets, including their servers that contain users' information, to a for-profit entity. A method of maintaining online privacy is known as the Dispersed Storage System (DSS). It uses sophisticated algorithms, such as an Information Dispersal Algorithm (IDA), to encrypt the user data with AES-256 keys, fragment the data, and then distribute the fragments to geographically distributed storage nodes on a series of dispersed networks or provide the fragments to the user to distribute to trusted individuals. No complete copy of the original data exists on any single node anywhere in the networks or in the hands of any one individual.

Encrypted, fragmented, distributed across multiple networks, and with access controlled by clients rather than their service providers, the DSS-protected data is nothing but useless bits to everybody but the user. No disgruntled employee of a provider could sell user information to a third party. No provider bankruptcy or merger would pose a threat to users' privacy. There would be no single point of failure. To access a user's information, one would, in effect, have to break into multiple "Fort Knoxes."

FIG. 1A illustrates a simplified block diagram 100a of a system for securely governing access to user data, according to some embodiments. The system may include a user device 106, which may include any user computing device, such as a laptop computer, a desktop computer, a smart phone, a tablet device, a PDA, a smart appliance, and so forth. The user device 106 may include a software application operating thereon that is provided by a service provider 102. As used herein, the term "service provider" may include cloud-based services, Software-as-a-Service (SaaS) providers, web services, search engines, email providers, and stand-alone applications running on the user device 106. In many instances, the service provider 102 will include a server-side component as well as a client-side component. The client-side component may include a service provider process 108 that operates in a web browser or as a stand-alone application on the user device 106. The user device 106 can be distinguished from the service provider 102 in that the "user" of the user device 106 may be a client, customer, or user of the service provider 102. For example, the service provider 102 may include the Google® search engine, and the user device 106 may include a laptop computer operated by someone using the Google® search engine.

The user device 106 may also include a privacy manager process 110 that interfaces with the service provider process 108 to govern access to user information. The privacy manager process 110 may be part of a privacy manager architecture that includes the privacy manager process 110 operating locally on the user device 106 as well as a privacy manager gateway 104 discussed in greater detail below. The privacy manager process 110 may be provided by an entity that operates the privacy manager gateway 104, and may be downloaded from an online app store or other online code repository. The privacy manager process 110 may operate as a stand-alone application, as a plug-in for a web browser, as a background process, as a mobile app, and so forth. For example, the privacy manager process 110 may operate as a web browser plug-in that provides the ability to modify and experience on third-party websites—such as Gmail—and to ensure that private data never exist in plaintext on any single server outside of the user device 106. The splitting and joining of data for dispersal may take place in the privacy manager process 110 as described below, rather than on any device other than the user device 106.

The privacy manager, or privacy manager system, can be distinguished from the user device 106 and from the service provider 102 in that the "user" of the user device 106 is a customer of the privacy manager system. A user may subscribe to the privacy service provided by the privacy manager system in order to govern access to the user's personal data as the user interfaces with the service provider. The service provider 102, the user device 106, and a privacy manager gateway 104 may each be owned, operated, and governed by separate and distinct legal entities.

The privacy manager gateway 104 may maintain credentials required to access a plurality of independent data centers 112. The user device 106 may first authenticate with the privacy manager gateway 104 in order to verify that the privacy manager system should allow the user device 106 to access data in the independent data centers 112. For example, the privacy manager gateway 104 may verify a user name, password, and/or other credential types provided by the user device 106 to authenticate a user identity. The privacy manager gateway 104 may also verify various account options, such as whether the user has paid their bills, whether suspicious behavior is been detected, and whether an amount of data to be stored by the user device 106 on the plurality of independent data centers 112 exceeds a predetermined threshold, such as a disk quota paid for by a customer. Once the privacy manager gateway 104 has authenticated the identity and authorization level, it provides the user device 106 with credentials necessary to complete the transaction with the independent data centers 112. Alternatively, some embodiments may instead allow the privacy manager gateway 104 to send the credentials directly to the independent data centers 112 without requiring the credentials to pass through the user device 106.

As described above, the independent data centers 112 may receive portions of encrypted and fragmented personal data that have been encrypted and dissected by the privacy manager process 110 operating on the user device 106. Each of the independent data centers 112 may reside in a geographically separate location separated by at least one mile. Each independent data center 112 may operate on an independent and separate network. In some embodiments, each of the independent data centers 112 may be owned/operated by separate and distinct organizations or legal entities, such as nonprofit organizations. Because of this organization, in the unlikely event that hackers gain access to even several of the independent data centers 112, and succeeded in downloading and decrypting information belonging to a user, they would still only have fragmented information that would be of little value.

Figure 1B:
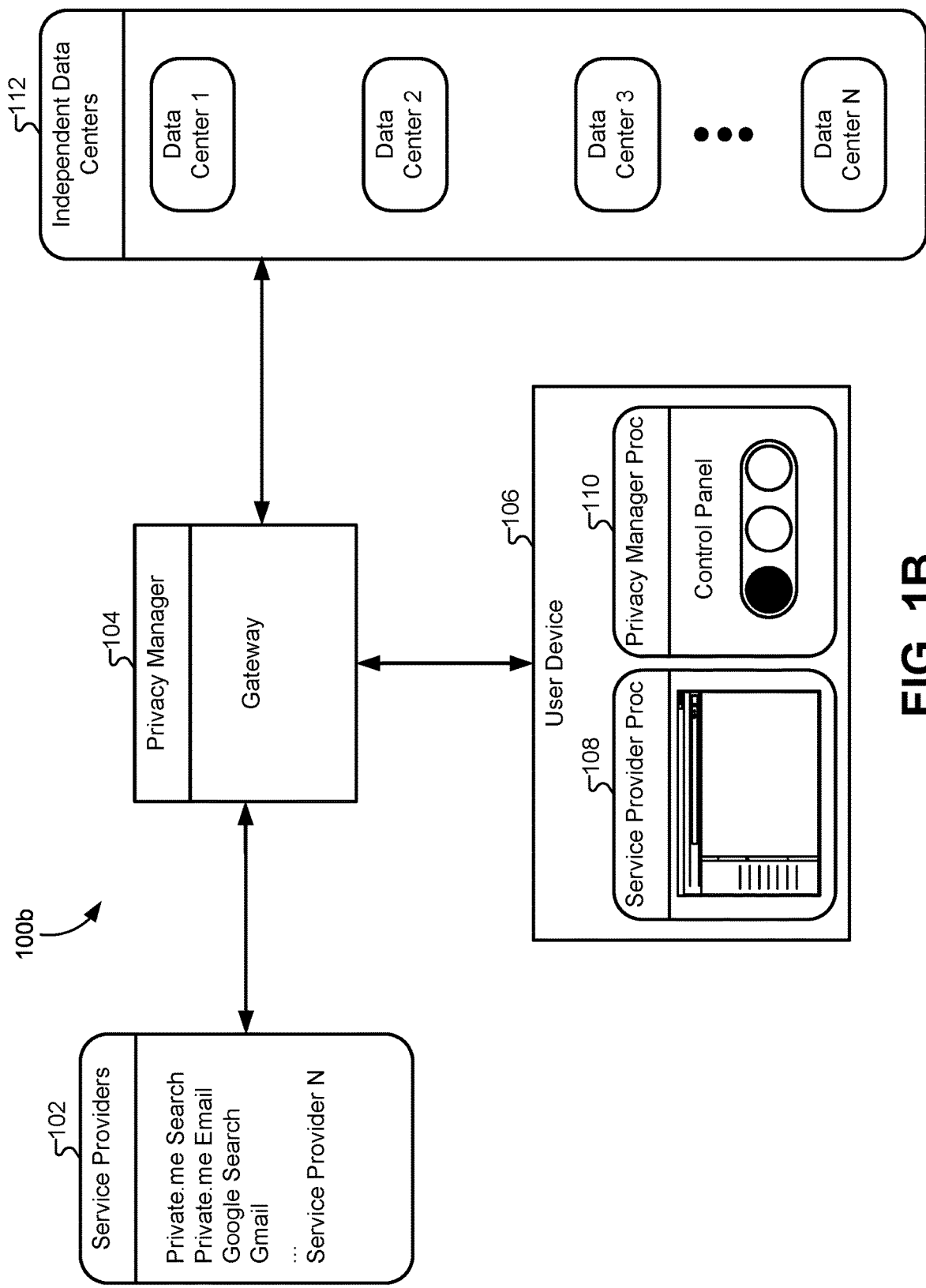
FIG. 1B illustrates a simplified block diagram of an alternative system for securely governing access to user data, according to some embodiments.

FIG. 1B illustrates a simplified block diagram 100b of an alternative system for securely governing access to user data, according to some embodiments. Block diagram 100b is similar to block diagram 100a, the difference being that the service provider 102 is able to communicate directly through the privacy manager gateway 104 instead of communicating through the user device 106. This architecture allows the service provider 102 to authenticate with the privacy manager gateway 104, then directly access the independent data centers 112 to retrieve the user data. The privacy manager process 110 on the user device 106 can still govern access to the user data on the independent data centers 112. The user device 106 is able to dynamically determine what level of access the service provider 102 is allowed to have at any given moment. This architecture allows the service provider 102 to have access to the user data when the user device 106 is off-line.

Figure 2:
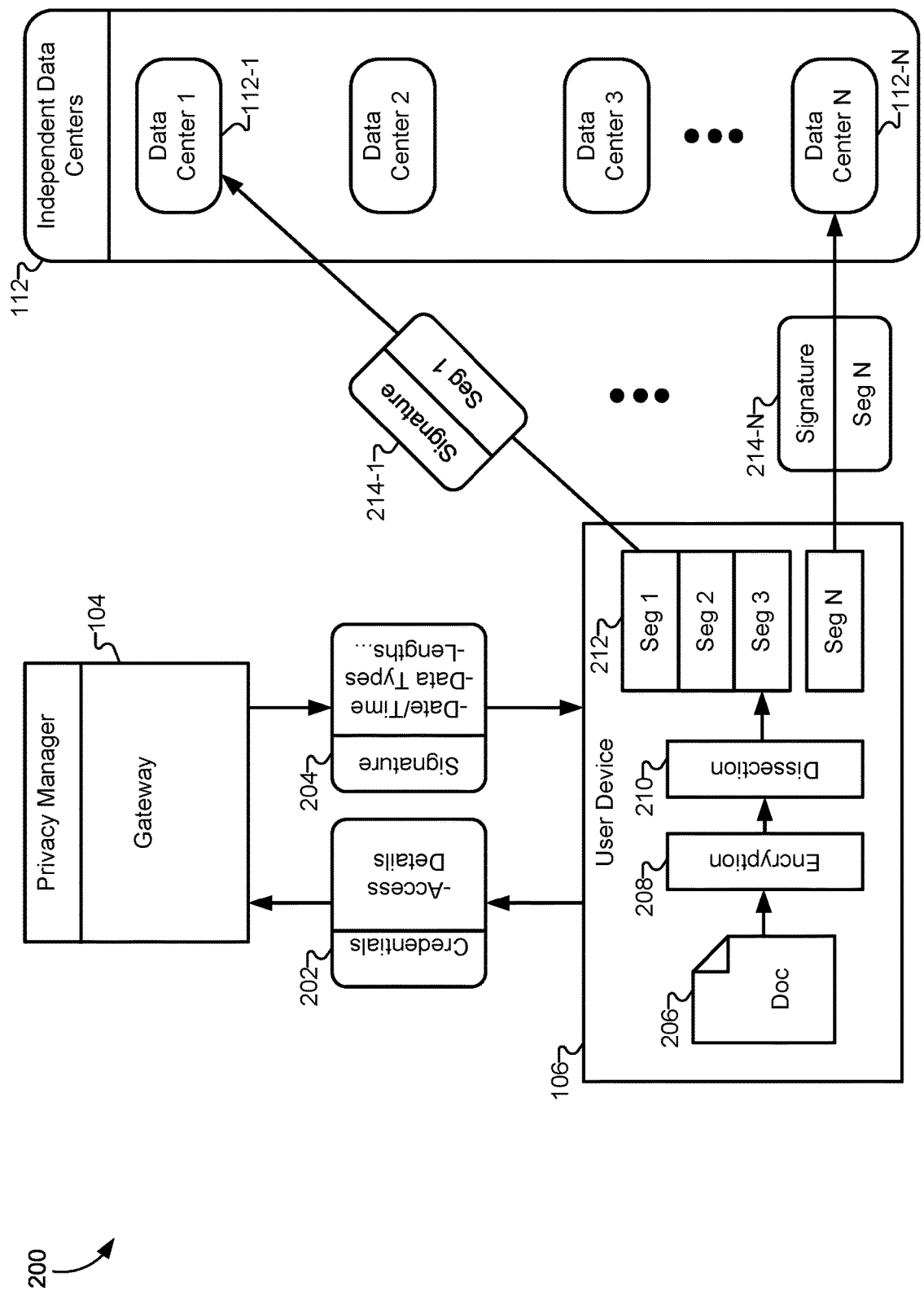
FIG. 2 illustrates a simplified block diagram of a process for encrypting, dissecting, and storing information on a plurality of independent data centers, according to some embodiments.

FIG. 2 illustrates a simplified block diagram 200 of a process for encrypting, dissecting, and storing information on a plurality of independent data centers 112, according to some embodiments. To securely store the user data, or document 206, the user device 106 sends a request 202 to the privacy manager gateway 104. The request 202 may include a set of credentials used to authenticate the identity of a user of the user device 106. The request 202 may also include details of how the user device 106 will access the independent data centers 112. For example, the request 202 may include a type of data being stored, an amount of data to be stored, an identity of the service provider, and so forth. The privacy manager gateway 104 can analyze the request 202 and determine whether the user device 106 should be allowed to access the independent data centers 112 as specified in the request 202. This operation may include determining whether a user account is associated with the user device 106, determining whether the credentials can be properly authenticated, determining whether a data type or operation type is part of a service purchased by a customer associated with the user device 106, and so forth.

If the request can be approved, the privacy manager gateway 104 may send a response 204 to the user device 106. The response 204 may include a signature that verifies that the operations requested in the request 202 have been approved by the privacy manager gateway 104. The response 204 may include information originally found in the request 202, such as data types/lengths. The response 204 may also include session information, expiration times, time intervals during which the transaction will be allowed, specific servers in the plurality of independent data centers 112 that may be accessed, and so forth.

When the request to access the independent data centers 112 is approved by the privacy manager gateway 104, the user device 106 can next encrypt, dissect, and send the document 206 to the independent data centers 112. In some embodiments, establishing an account with the privacy manager system may cause a secret key to be generated/stored on the user device 106, designated herein as "Key1." Key1 may only exist on the user device 106 and may be inaccessible by both the privacy manager gateway 104 and any of the independent data centers 112. An encryption process 208 may use Key1 to encrypt the entire plaintext of the document 206.

Next, a dissection process 210 can be used to split the ciphertext provided by the encryption process 208 into a plurality of data portions 212. Various algorithms may be used by the dissection process 210. For example, as described below in relation to FIGS. 9, an algorithm may divide the ciphertext into n portions, where at least k of the n portions are required to reconstruct the data. This ensures that the dissected data remains secure provided that fewer than k of the n independent data centers 112 are compromised. This also allows (n-k) data centers to fail before losing the user data. These algorithms represent a trade-off between data security and data availability. In some embodiments, the dissection algorithm may include randomized data being inserted during various stages of the dissection process to generate the plurality of data portions 212. In some embodiments, the number of data portions 212 that are produced may be determined by a number of the independent data centers 112 that are available to the user device 106. For example, some service levels may allow the data portions 212 to be stored on a greater number of the independent data centers 112, according to a user account preferences or paid—for services.

After encrypting and dissecting the document 206, the plurality of data portions 212 may each be sent to individual ones of the independent data centers 112. In some embodiments, each transmission 214 may include at least one of the data portions 212 and some form of the signature provided in the response 204 from the privacy manager gateway 104. When the independent data centers 112 receive the data portions 212, they can verify that the signature information has authorized the operation. For example, the independent data centers may verify the signature using keys provided from the privacy manager gateway 104. If more data is transmitted than was authorized, if the user's account is out of date or unpaid, if the data type or service provider does not match the signature information, if the transmissions 214 occur outside of a designated time window, or if any other criteria specified by the signature information is unmet, the independent data centers 112 can reject the transmissions 214. In cases where the data portions 212 fit within the criteria established by the signature information, the independent data centers 112 can store the data portions securely.

In order to retrieve the document 106 from the independent data centers 112, the reverse process described above may be followed. Specifically, the user device 106 can send the request 202 to the privacy manager gateway 104 specifying the type and amount of information to be retrieved. The privacy manager gateway 104 can provide a response 204 with a signature authorizing retrieval of the information. The user device 106 can then send signature information along with a request to the independent data centers 112, and receive in return the plurality of data portions 212. Using an inverse dissection algorithm 210, such as the algorithm described below in relation to FIGS. 10A-10C, the user device 106 can reassemble the ciphertext and decrypt the document 206 using Key 1. The document 206 can then be provided to a service provider.

Figure 3:
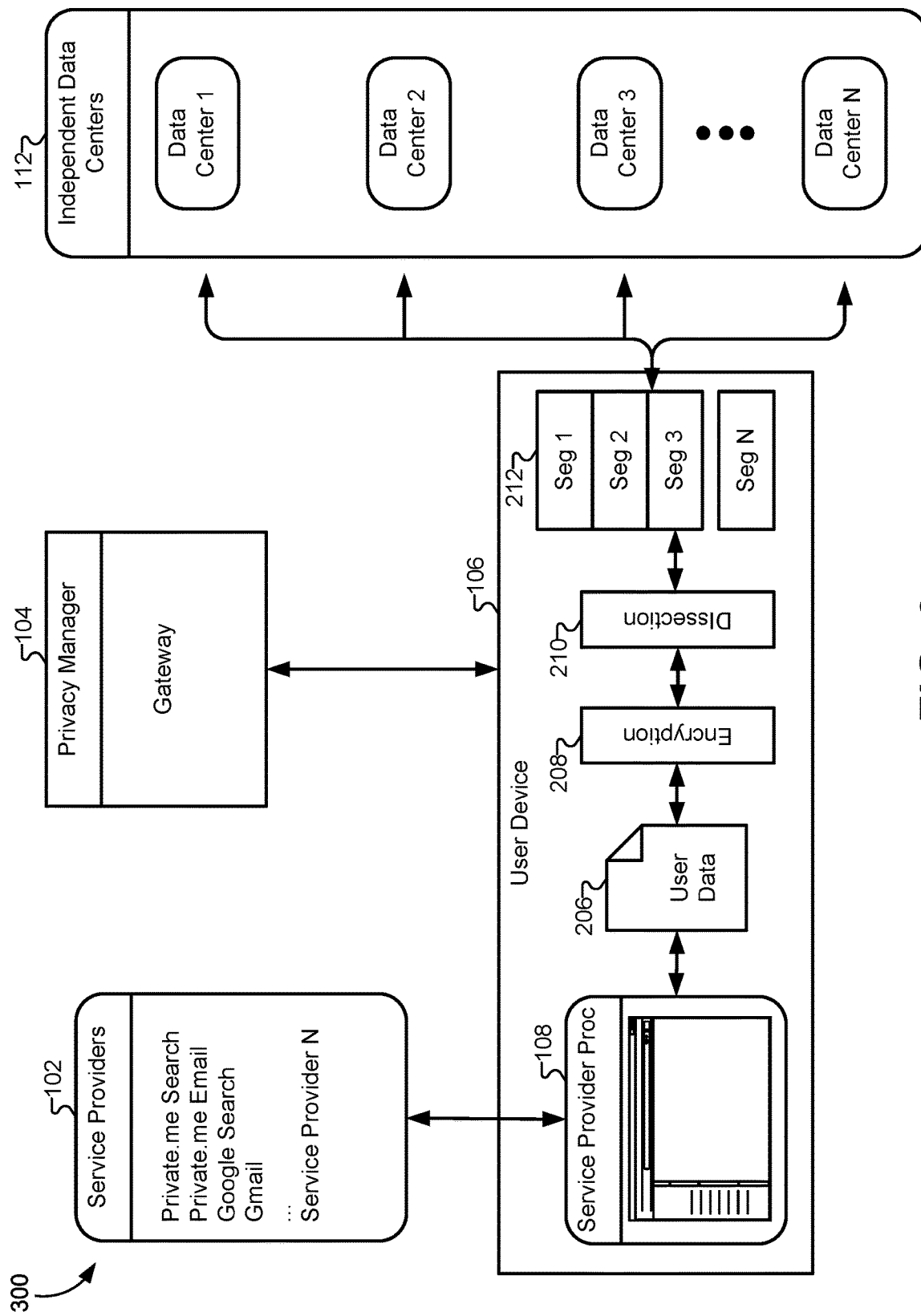
FIG. 3 illustrates a block diagram for interfacing with a service provider, according to some embodiments.

FIG. 3 illustrates a block diagram 300 for interfacing with a service provider 102, according to some embodiments. This embodiment may be used for retrieving user data from a service provider 102 and/or providing user data to a service provider 102. In one exemplary embodiment, the service provider may include a search engine. A user search history and/or search preferences may be represented in block diagram 200 as the document 206. The document 206 may be provided to the search engine in order to allow the user to browse their search history inside the traditional web interface. The document 206 may be also provided from the web browser after a number of searches have been performed.

In some embodiments, the user data will never leave the user device 106. The data is provided to the service provider process 108, such as a client-side search browser interface, and is deleted as soon as the session with the service provider process 108 is finished. For example, when the user closes their web browser, the search history may be removed from the browser cache and deleted. The search history can then be encrypted, dissected, and uploaded to the independent data centers 112 by the privacy manager process operating as a browser plug-in. This entire process can take place in a manner that is transparent to the user. When the user opens their web browser, their search history may be fully available while maintaining absolute security and control over that search history.

In some embodiments, the user data in document 206 may be allowed to be transmitted to the service provider 202 in limited circumstances. In these cases, the service provider 102 must verify that the user data is deleted from their systems as determined by the settings provided by the privacy manager process. Note that in these cases, the service provider 102 still does not have access to Key1 in order to decrypt the user data. The service provider 102 also may not have access to the independent data centers 112.

Figure 4:
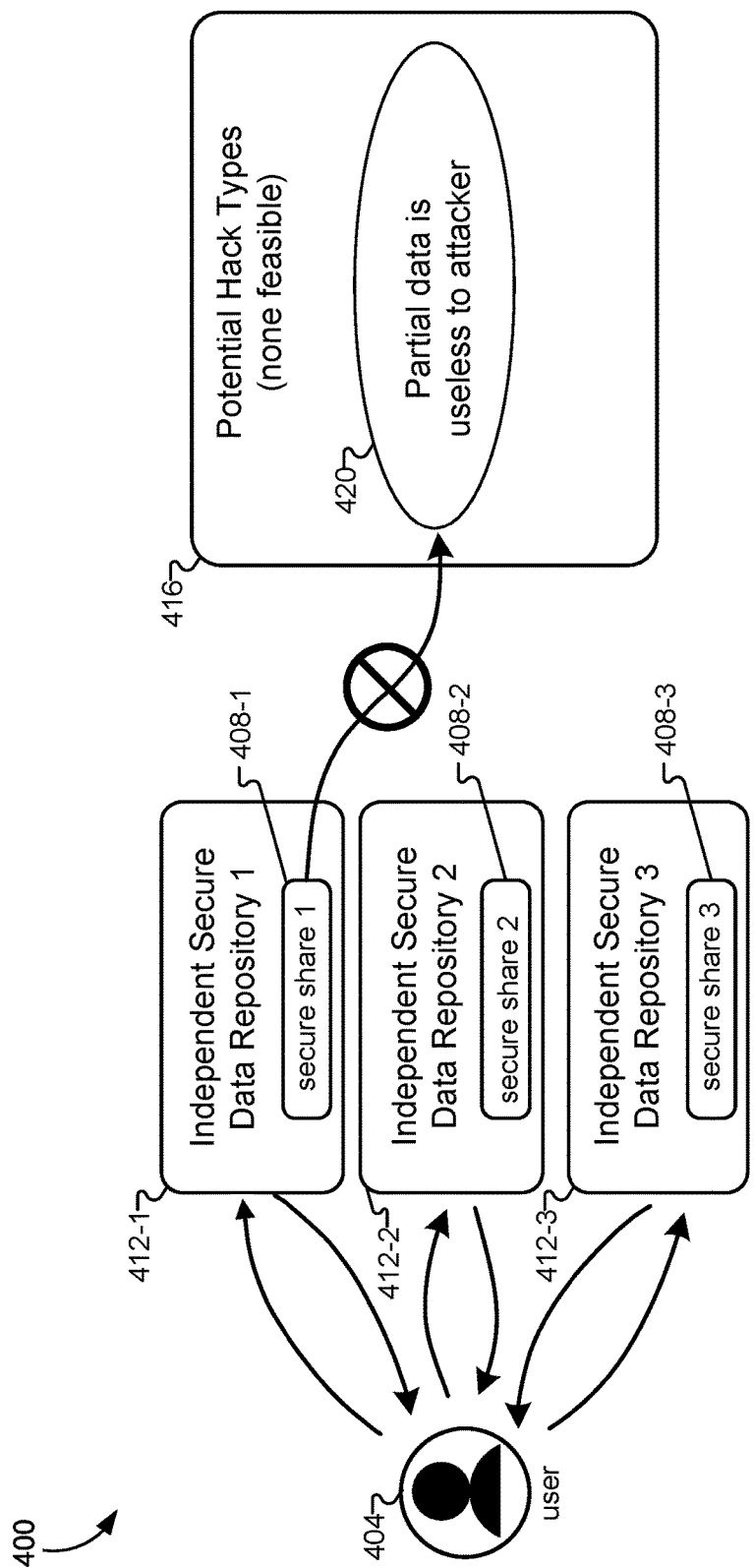
FIG. 4 illustrates a block diagram of a multi-server information dispersal model, according to some embodiments.

FIG. 4 illustrates a block diagram 400 of a multi-server information dispersal model according to some embodiments. In some embodiments, data from user 404 may be divided into multiple secure shares 408 and dispersed across multiple independent secure data repositories 412. For example, encrypted and fragmented personal data from a user device, such as user device 106, may be dispersed to multiple data centers, such as independent data centers 112, as described above in relation to FIG. 2. As another example, independent secure data repositories 412 may be various trusted individuals or institutions capable of storing a physical copy of secure shares 408. Employing an information dispersal model, such as the Dispersed Storage System (DSS) described above, may reduce or eliminate a number potential vulnerabilities. As described above, storing sensitive user information in a single location, repository, or server system, even when encrypted and password protected, may leave the information vulnerable to a number of weaknesses and potential hack types 416, such as actual hacks, data leaks, or compromised login credentials. If any of these weaknesses are successfully exploited, the entire package of sensitive information may become available and any desired privacy may be entirely lost. Further, even if the underlying information remains encrypted, it may still be vulnerable to ransomware attacks resulting in the entire information becoming inaccessible to the intended user.

Employing an information dispersal model, such as the Dispersed Storage System (DSS) described above in relation to FIG. 2, may reduce or eliminate these threats by fragmenting and dispersing secure user data across multiple independent secure data repositories 412. Even if a bad actor were able to access partial data 420, the threat from the unauthorized access would be greatly reduced. For example, because multiple secure shares 412 are required to reassemble the secure data, partial data 420 would be useless without at least one or more of the remaining secure shares 412 and there would be little to no possibility of exposing the secure data with partial data 420 alone. As another example, if partial data 420 were encrypted as part of a ransomware attack, the secure data could still be reassembled using other secure shares 412, thus rendering the ransomware attack ineffective.

An Information Dispersal Algorithm (IDA) may be used to fragment or slice data prior to dispersing the data according to an information dispersal model. One goal of an IDA may be to produce shares of user data such that possessing fewer than a designated threshold of shares will not permit decryption or discovery of the underlying data by any brute force technique. An IDA that accomplishes this goal may be considered to have "perfect" secrecy according to information theory and/or computer science definitions, in that it achieves cryptographic information theoretic security. Another goal of an IDA may be to produce shares of user data such that each share is no larger than the length of the original user data. An IDA that accomplishes this goal may be considered to be "ideal" according to information theory and/or computer science definitions.

Figure 5:
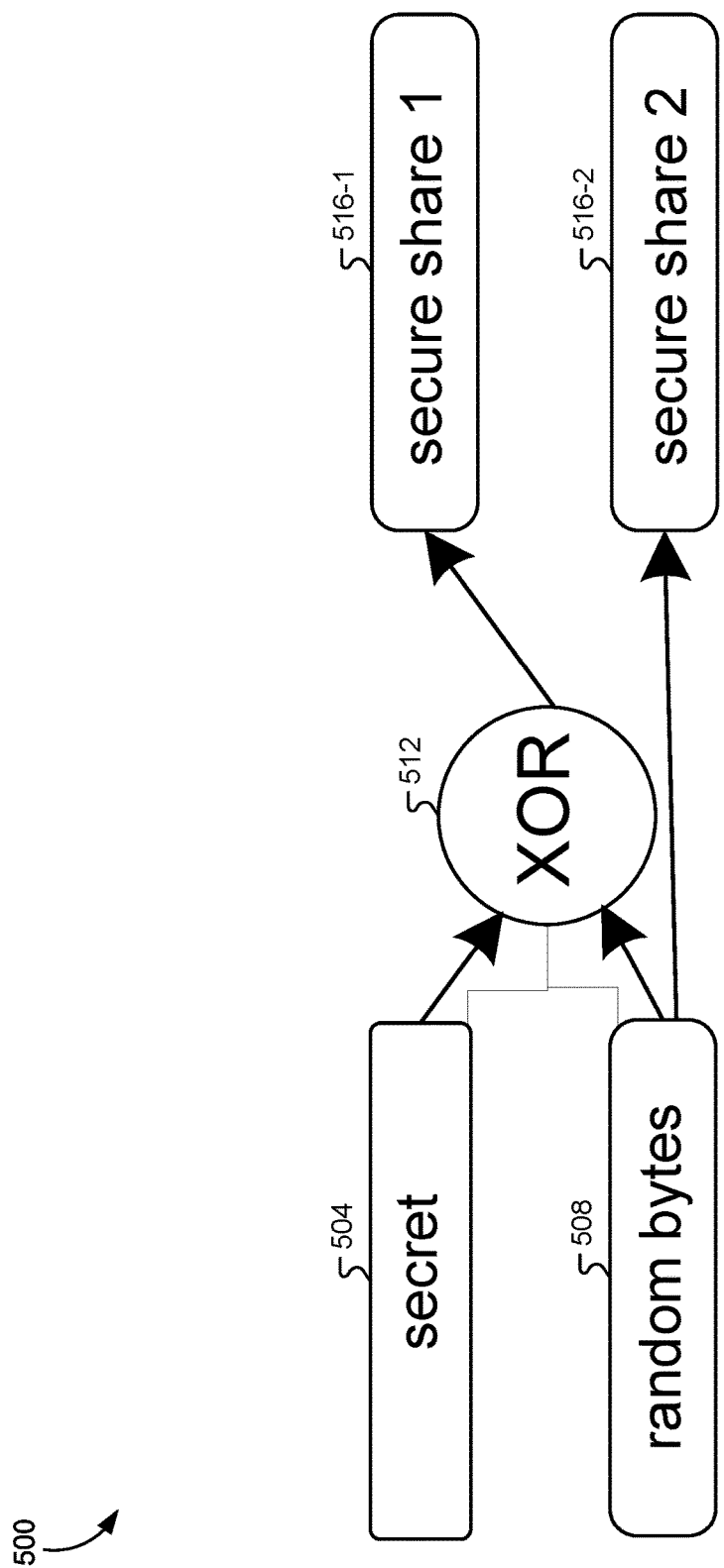
FIG. 5 illustrates a block diagram of an information dispersal algorithm, according to some embodiments.

FIG. 5 illustrates a block diagram 500 of an IDA according to some embodiments. In some embodiments, an IDA may produce two secure shares where both secure shares are required in order to reassemble the original information. In this case the threshold number of shares, as described above, would be equal to the total number of shares created. For example, as illustrated in FIG. 5, secret 504 may be combined with random bytes 508 using operation 512 to produce first secure share 516-1 while random bytes 508 may be dispersed as second secure share 516-2. In this example, if an attacker were to possess second secure share 516-2, they would obviously not have any information about the secret, as it would only be random information. Similarly, if an attacker were to possess first secure share 516-1, it would be indistinguishable from random bytes as a result of being combined with random bytes. However, secret 504 may be reassembled if both secure shares 416 are by combined using the reverse of operation 512. Thus, as described above, such an algorithm would be considered to have perfect secrecy according to information theory and/or computer science definitions, as possessing fewer than the threshold number of shares, in this case two, would not permit decryption of the data.

In some embodiments, an IDA produces additional numbers of secure shares, as described below in relation to FIGS. 9-10C. For example, an IDA may produce 3, 5, 7, or more secure shares. In some embodiments, any threshold number of secure shares, greater than one, may be required to reassemble the secret information. For example, where 5 total secure shares are created, a minimum of 2, 3, 4, or 5 shares may be required to reassemble the secret information. In some embodiments, balancing security with convenience or computational feasibility is achieved by selecting an optimal number of total shares and the threshold number of required shares to reassemble the data. For example, while creating 5 or more shares and requiring each share to reproduce the data may be more secure, creating three shares and requiring only two of the three shares to reproduce the data may be more computationally feasible and less onerous for users to reassemble their data. In some embodiments, the number of shares and the minimum threshold are selected by a user. For example, a user may select from a variety of combinations using a user interface.

In some embodiments, secret information represents any type of information or data. For example, secret information may be text, images, movies, program code, etc. In some embodiments, secret 504, random bytes 508, and secure shares 516 are represented as a plurality of binary bytes or bits. For example, if secret 504 was originally text, it may first be converted to a plurality of bytes using any suitable conversion, such as an ASCII or UTF-8 conversion. In some embodiments, operation 512 includes computing the result of the exclusive disjunction, or XOR, between secret 504 and random bytes 508. For example, where both secret 504 and random bytes 508 are represented as binary bits, the result of operation 512 would produce a '1' where either a secret bit or a random bit was '1', but not both, and a '0' in all other cases. Similarly, the reverse of operation 512 may include computing the result of the exclusive disjunction between first secure share 516-1 and second secure share 516-2 to produce secret 504.

In some embodiments, random bytes 508 are generated using a random number generator. For example, a hardware random number generator may generate random numbers as a function of the current value of some physical environment attribute that is constantly changing in a manner that is practically impossible to predict. In some embodiments, generating random bytes 508 depends on the number of bits used to represent secret 504. For example, after determining that secret 504 is represented by a first number of bits, random bytes 508 may be generated with at least as many random bits as the first number.

In some embodiments, an IDA applies additional layers of security before and/or after creating the secure shares. For example, one or more encryption schemes may be applied to the user data prior to creating the secure shares, as described below in relation to FIGS. 6 and 7. As another example, one or more transformations may be applied to the secure shares after they are created, as described below in relation to FIG. 8.

Figure 6:
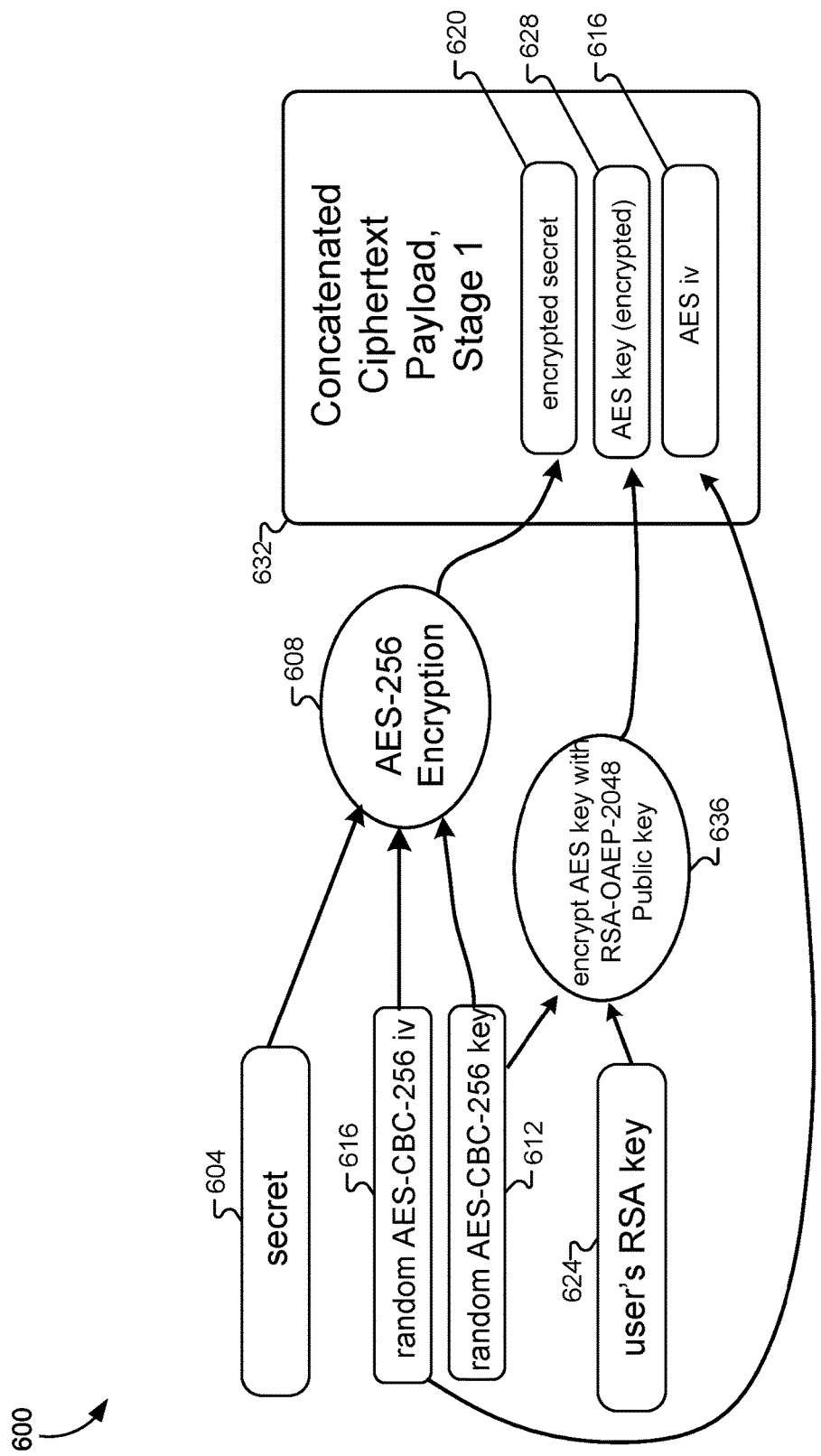
FIG. 6 illustrates a block diagram of a stage in an information dispersal algorithm for encrypting data, according to some embodiments.

FIG. 6 illustrates a block diagram 600 of a stage in an information dispersal algorithm for encrypting data according to some embodiments. In some embodiments, user data is encrypted using an end-to-end mechanism prior to dispersal. While the encrypted data may not be information theoretically secure, encrypting the user data prior to dispersal may further increase the security of the user data in the unlikely event that the threshold number of dispersed shares were accumulated by an unauthorized entity. In some embodiments, an AES encryption algorithm may be used to encrypt the user data. For example, as illustrated in FIG. 6, secret 604 may be encrypted by AES-256-CBC algorithm 608, using one-time symmetric key 612 and initialization vector 616, to create encrypted secret 620. After creating encrypted secret 620, public-key encryption scheme 636, such as RSA-OAEP-2048, may be used to combine one-time symmetric key 612 with user's RSA key 624 to produce encrypted AES key 628. Finally, encrypted secret 620 may be concatenated with encrypted AES key 628 and initialization vector 616 to produce ciphertext payload 632. While specific encryption algorithms are discussed herein, it should be clear that any similarly suitable encryption algorithm may be used to initially encrypt user data.

Figure 7:
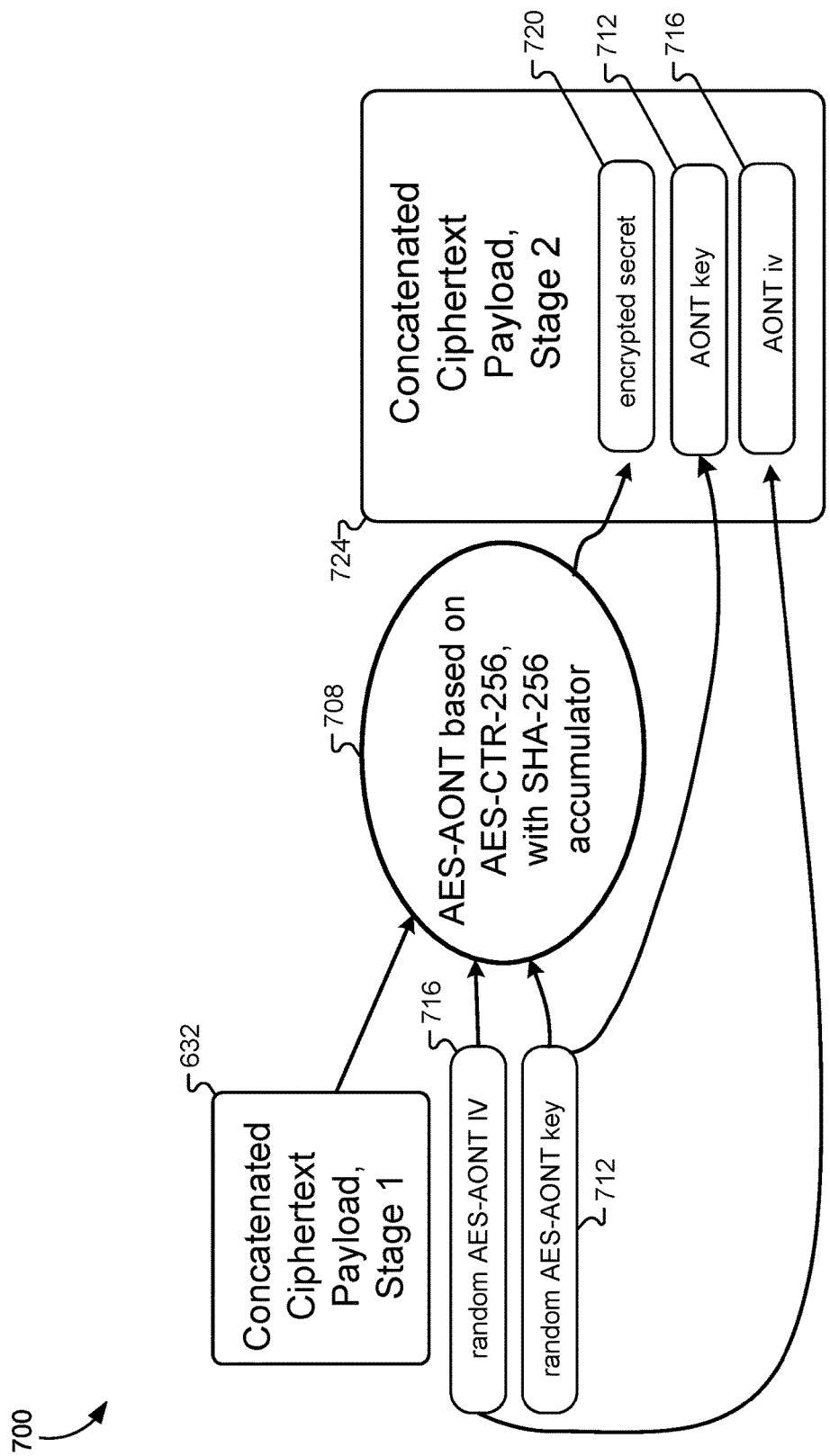
FIG. 7 illustrates a block diagram of a stage in an information dispersal algorithm for transforming data, according to some embodiments.

FIG. 7 illustrates a block diagram 700 of a stage in an information dispersal algorithm for transforming data according to some embodiments. In some embodiments, an all-or-nothing transform is applied to the user data prior to dispersal. The all-or-nothing transform may be performed on the user data alone and/or a previously encrypted ciphertext payload, such as ciphertext payload 632 as described above in relation to FIG. 6. Applying an all-or-nothing transform to user data, encrypted or not, may further increase the strength of the overall encryption by preventing decryption of only a subset of the payload or user data. In some embodiments, an AES all-or-nothing transform algorithm may be used to transform or further encrypt the user data or ciphertext payload. For example, as illustrated in FIG. 7, ciphertext payload 632 may be transformed by AES all-or-nothing transform 708 based on AES-CTR-256, with SHA-256 accumulator, using one-time symmetric key 712 and initialization vector 716, to create encrypted secret 720. Then, encrypted secret 720 may be concatenated with one-time symmetric key 712 and initialization vector 716 to produce ciphertext payload 724. While specific all-or-nothing transform algorithms are discussed herein, it should be clear that any similarly suitable all-or-nothing transform algorithm may be used to transform or further encrypt the user data and/or ciphertext payload.

Figure 8:
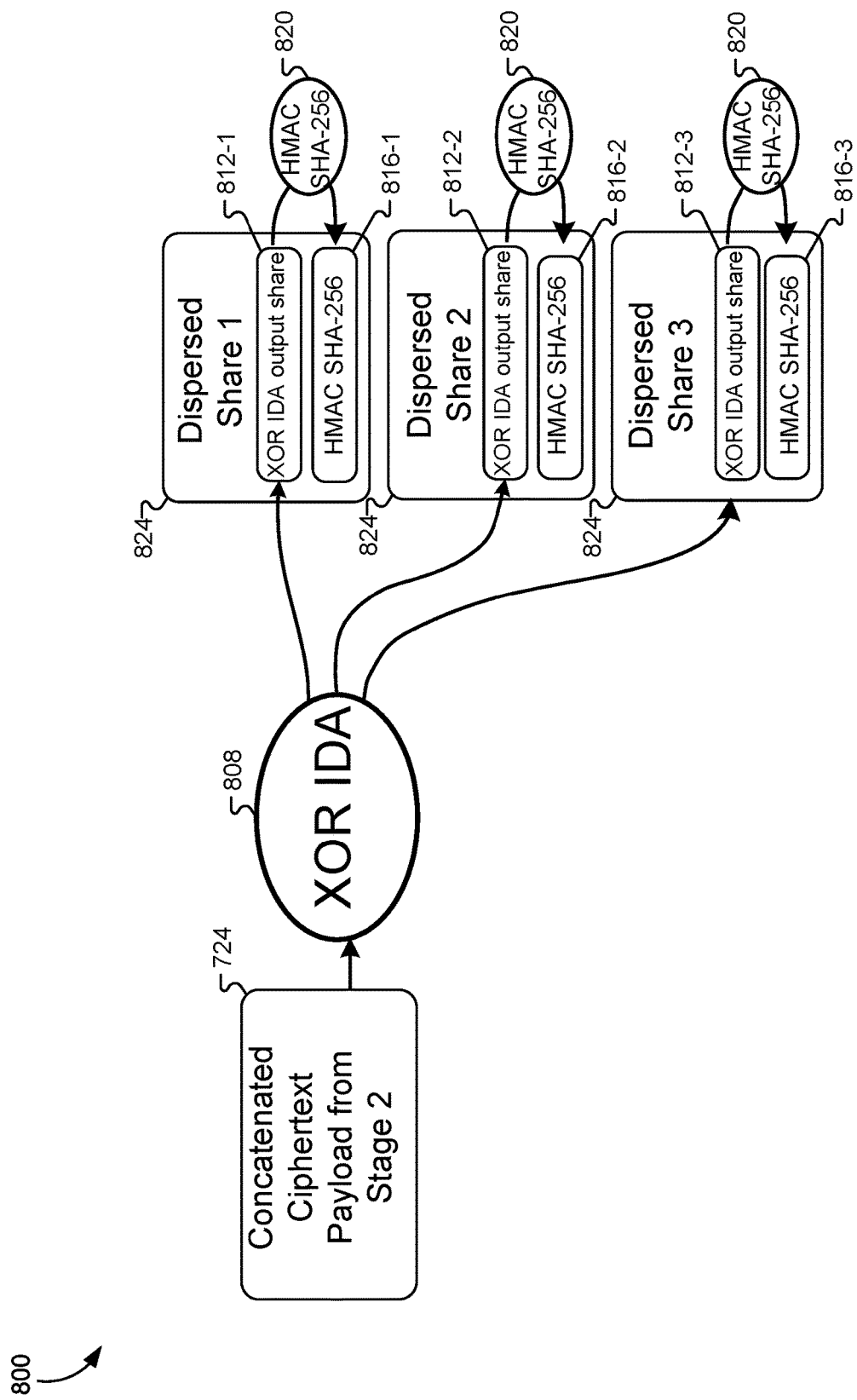
FIG. 8 illustrates a block diagram of a stage in an information dispersal algorithm for dispersing data, according to some embodiments.

FIG. 8 illustrates a block diagram 800 of a stage in an information dispersal algorithm for dispersing and authenticating data according to some embodiments. In some embodiments, after creating secure shares, authentication codes are concatenated with the secure share prior to dispersal. Concatenating an authentication code may provide for easier error detection and prevent tampering of the secure shares. In some embodiments, the authentication code is a hash-based message authentication code (HMAC) created using a secure hash algorithm (SHA), such as SHA-256. For example, as illustrated in FIG. 8, after secure shares 812 are created from ciphertext payload 724 using dispersal operation 808, authentication codes 816 may be created for each secure share 812 using SHA operation 820. Finally, secure shares 812 may be concatenated with authentication codes 816 and dispersed as dispersed shares 824 to independent secure data repositories, such as independent secure data repositories 412 as described above in relation to FIG. 4.

Figure 9:
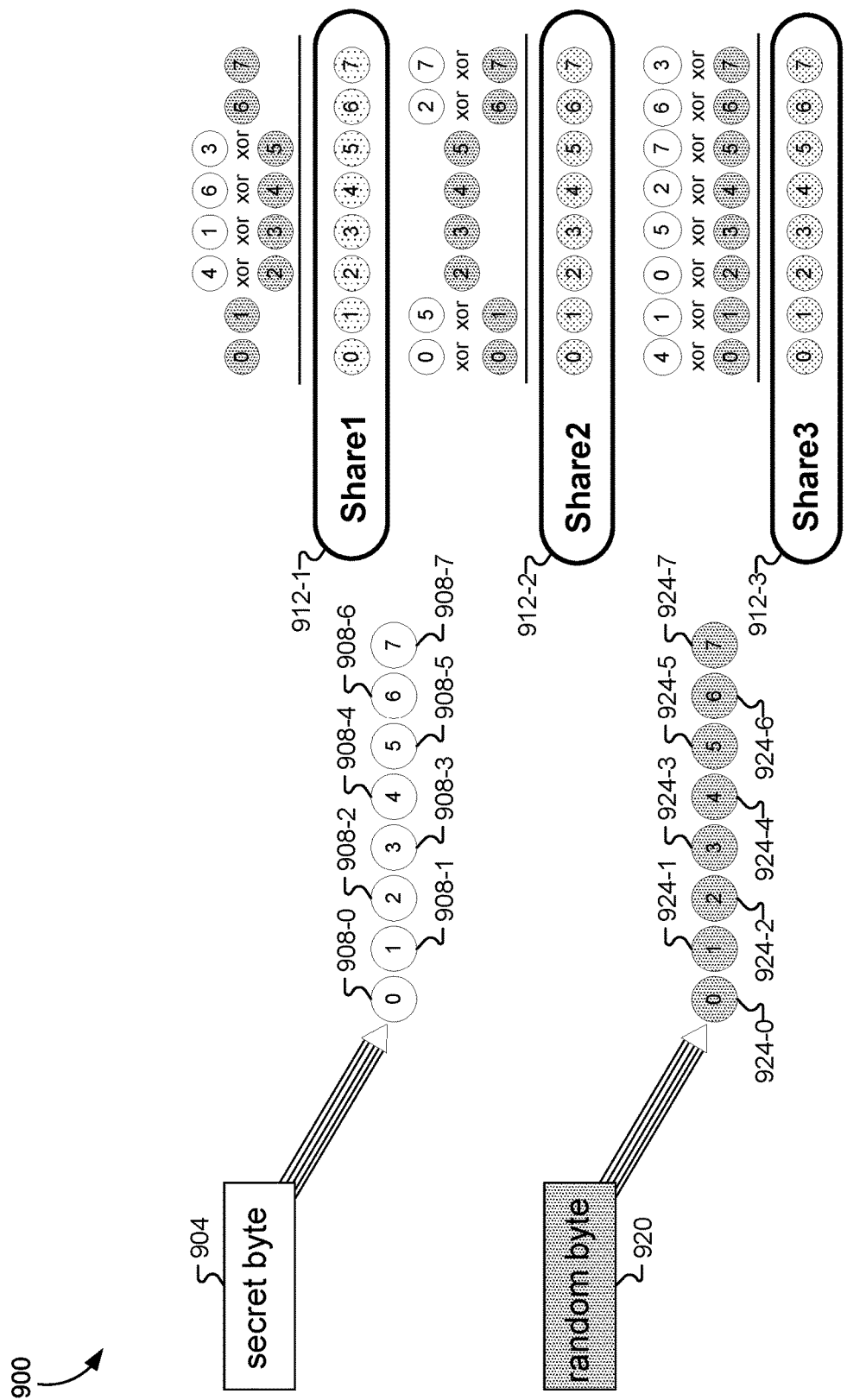
FIG. 9 illustrates an exemplary dispersal of a sample set of data in an information dispersal algorithm, according to some embodiments.

FIG. 9 illustrates an exemplary dispersal 900 of a sample set of data in an information dispersal algorithm, according to some embodiments. As described above in relation to FIG. 5, an IDA may create a plurality of secret shares from the user data. For example, as illustrated in FIG. 9, dispersal 900 of secret data, such as secret 604, ciphertext payload 632, and/or ciphertext payload 724 as described above in relation to FIGS. 6-7, may result in three secure shares 912. In some embodiments, secret data may be represented as a plurality of bytes. For example, secret byte 904 may be one of a plurality of secret bytes that make up the entirety of the secret data. Each secret byte 904 may be comprised of 8 bits 908 indexed from 0 to 7. In some embodiments, dispersing the secret data may be performed on the secret data as a whole, and/or iteratively on each secret byte 904. For example, each secret byte 904 may be dispersed one at a time into secure shares 612.

In some embodiments, generating each secure share includes selecting a subset of the secret data based on the secure share being generated. For example, a first half of the secret data, may be selected for a first secure share, a second half of the secret data may be selected for a second secure share, and all of the secret data may be selected for a third secure share.

In some embodiments, selecting the subset of secret data for each secure share comprises selecting a subset of bits from each byte of the secret data, where the selected subset of bits are the same for each byte of the secret data. For example, for each secret byte 904 of the secret data, a first bit, a second bit, a third bit, and a fourth bit from each secret byte 904 may be selected for first secure share 912-1, a fifth bit, a sixth bit, a seventh bit, and an eighth bit are selected for second secure share 912-2, and the first bit, the second bit, the fifth bit, the sixth bit, the seventh bit, the eighth bit, the third bit, and the fourth bit are selected again in that order for third secure share 912-3.

In some embodiments, selecting the subset of bits includes selecting bits of the secret byte in a particular order. For example, the first bit may be any bit 908 at index 'x', and each subsequent bit 908 at index '(x+5) mod 8 is selected until every bit has been selected once. To illustrate, the first bit may be bit 908-4 at index 4; the second bit may be bit 908-1 at index 1 (e.g., {(4+5) mod 5}); the third bit may be bit 908-6 at index 6; the fourth bit may be bit 908-3 at index 3; the fifth bit may be bit 908-0 at index 0; the sixth bit may be bit 908-5 at index 5; the seventh bit may be bit 908-2 at index 2; and the eighth bit may be bit 908-7 at index 7.

In some embodiments, after selecting a subset of the secret data, each subset is combined with a sequence of random bits to generate shares that are information theoretically secure, as described above in relation to FIG. 5. In some embodiments, a byte of the sequence of random bits is selected for each byte of the user data. For example, as illustrated in FIG. 9, for each secret byte 904, random byte 920 may be selected. Each random byte 920 may be comprised of 8 bits 924 indexed from 0 to 7.

In some embodiments, combining the subset of the secret data with the sequence of random bits is performed after selecting the subset of bits from each byte of the secret data. For example, after selecting a first, second, third, and fourth bit of each secret byte 904 for first secure share 912-1, the subset of bits may be combined with random byte 920 of random data. Any extra bits of random byte 920 that are not combined with a bit of the subset of bits may remain unchanged in the resulting combination. In some embodiments, the selected subset of bits for each byte of secret data are combined with a specific bit of each random byte of the sequence of random bits. For example, as illustrated in FIG. 9, the selected subset of bits for first secure share 912-1 may be combined with the middle four bits of random byte 920, the selected subset of bits for second secure share 912-2 may be combined with the outside four bits of random byte 920, and the selected subset of bits for third secure share 912-3 may be combined with each bit of random byte 920. After combining the selected subset of bits with the specific bits of random byte 920, any remaining bits of random byte 920 not paired with a bit of the subset of bits may be used to pad each secure share 912, thereby generating secure shares with the same length as the original secret data.

In some embodiments, combining the selected subset of secret data with the sequence of random bits includes determining the result of the exclusive disjunction between the subset of bits and the random bits. For example, if the subset of bits for first secure share 912-1 is '1010' and random byte 920 is '11001100', the result of the exclusive disjunction between the subset of bits and the middle four bits of random byte 920 would be '11100100'. As illustrated by this result, each byte of first secure share 912-1 would comprise the first two bits of random byte 920 unaltered, the result of the exclusive disjunction between the subset of bits and the middle four bits, and the last two bits of random byte 920 again unaltered. Logically, it would follow that the result of the exclusive disjunction between the first disjunction and the random byte would reproduce the subset of bits, essentially canceling out the original exclusive disjunction. For example, the result of the exclusive disjunction between random byte 920 (e.g., '11001100') and the first disjunction (e.g., '11100100') would be '00101000', with the middle four bits being the same as the original subset of bits (e.g., '1010'). It should be understood that similar logic would apply where the subset of bits was combined with the outside four bits of random byte 920.

In some embodiments, as described above in relation to FIG. 5, the secret data may be reassembled using a subset of the generated secure shares. For example, where the secret data has been dispersed into three secure shares 912, any combination of two secure shares 912 may be used to reassemble secret data. While three secure shares are discussed herein with two secure shares being required to reassemble the secret data, it should be understood that the same concepts may be employed to generate any number of secure shares with various minimum thresholds for reassembly.

Figure 10A:
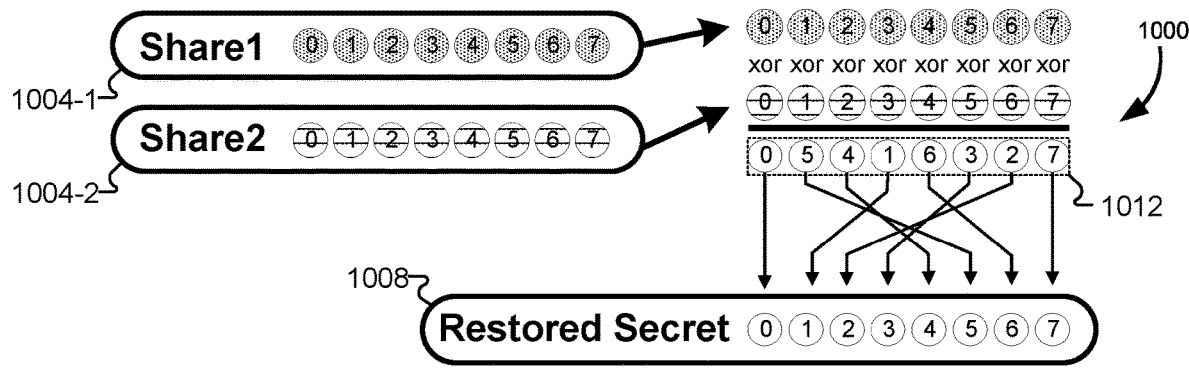
FIGS. 10A-10C illustrate example reassemblies of dispersed shares in an information dispersal algorithm, according to some embodiments.
Figure 10B:
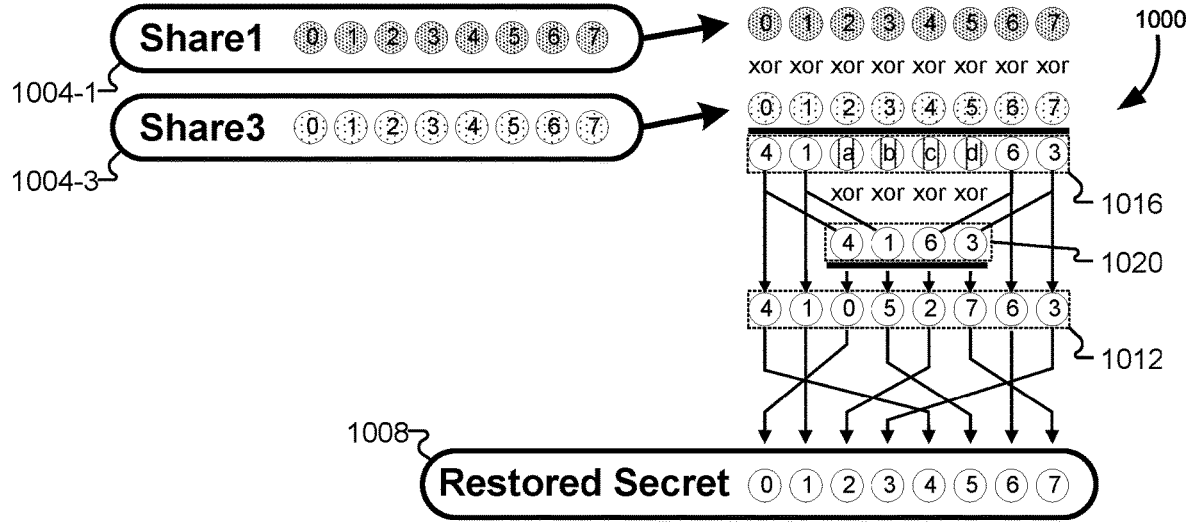
Figure 10C:
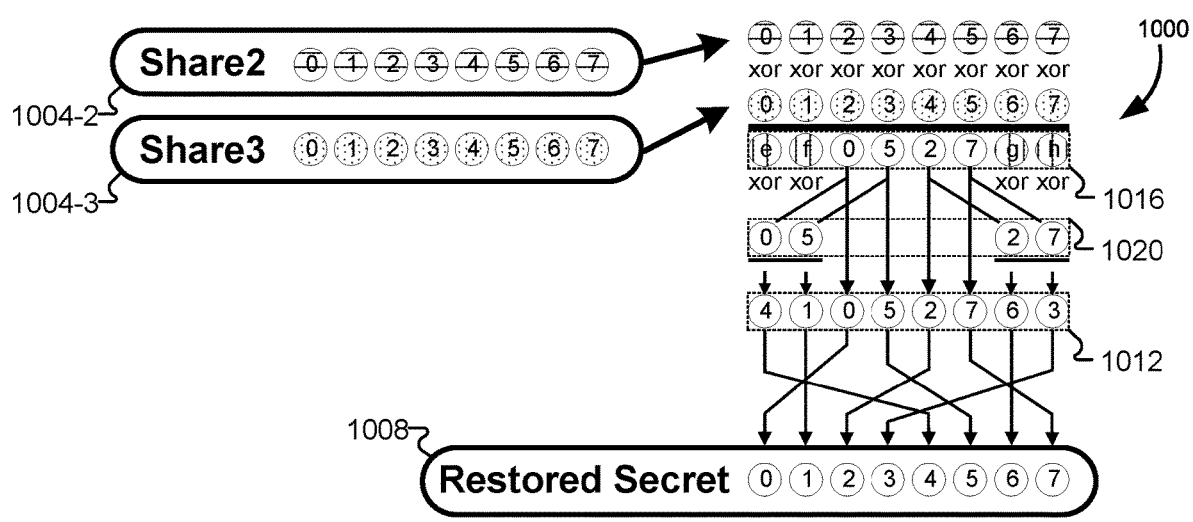

FIGS. 10A-10C illustrate an exemplary reassemblies 1000 of dispersed secret shares in an information dispersal algorithm, according to some embodiments. As discussed above, secret data that has been dispersed may be reassembled using a subset of the dispersed shares. FIGS. 10A-10C illustrate generating restored secret 1008 from secure shares 1004 where three secure shares 1004 were originally created and dispersed. For example, FIG. 10A illustrates using first secure share 1004-1 and second secure share 1004-2 to produce restored secret 1008. As another example, illustrated by FIG. 10B, first secure share 1004-1 and third secure share 1004-3 may be used to produce the same restored secret 1008. As yet another example, illustrated by FIG. 10C, second secure share 1004-2 and third secure share 1004-3 may be used to produce the same restored secret 1008. Each secure share 1004 may be generated using the same or similar techniques as described above in relation to FIG. 9.

In some embodiments, reassembling or reproducing the secret data begins by determining the exclusive disjunction between the available secure shares, thereby producing an intermediate sequence of bits. The secure shares may comprise a plurality of bytes indexed from 0 to 7, as described in relation to FIG. 9. Similarly, intermediate sequence of bits may comprise a plurality of bytes indexed from 0 to 7. For example, as illustrated in FIG. 10A, the result of the exclusive disjunction between first secure share 1004-1 and second secure share 1004-2 may produce an intermediate sequence of bits 1012. Assuming each secure share was generated as described above in relation to FIG. 9, then each byte of first secure share 1004-1 would comprise the result of the exclusive disjunction between a random byte and four bits of secret data at indexes 2 through 5, each byte of second secure share 1004-2 would comprise the result of the exclusive disjunction between the same random byte and the remaining four bits of secret data at indexes 0 through 1 and 6 through 7, and the remaining bits of both first secure share 1004-1 and second secure share 1004-2 would be the random bits of the same random byte. Logically then, the exclusive disjunction between first secure share 1004-1 and second secure share 1004-2 would result in reversing the original exclusive disjunction performed on each subset of bits of the secret data.

To illustrate using a simple example, assume a byte of secret data is '10111101', the random byte is '11001100', and the subset of bits are '1011' and '1101' (e.g., the first and second halves of the secret data). Combining the first subset (e.g., '1011') with the middle four bits of the random byte would produce: '11100000'. Combining the second subset (e.g., '1101') with the outside four bits of the random byte would produce: '00001101'. As is evident, the outside four bits of the first result and the middle four bits of the second result, are the same as the random byte (e.g., '11001100'). Thus, the exclusive disjunction between the first result (e.g., '11100000') and the second result (e.g., '00001101'), producing '11101101', is the equivalent of combining the middle four bits of the first result with the random byte and the outside four bits of the second result with the random byte, thereby reversing the original exclusive disjunctions.

In some embodiments, combining secure shares results in a preliminary sequence of bits that is then combined with a subset of itself to produce an intermediate sequence of bits. For example, as illustrated in FIGS. 10B and 10C, combining first secure share 1004-1 or second secure share 1004-2 with third secure share 1004-3 results in preliminary sequence of bits 1016. Preliminary sequence of bits 1016 may then be combined with preliminary subset 1020 to produce intermediate sequence of bits 1012.

In some embodiments, the subset of the preliminary sequence of bits is selected and combined with specific bits of the preliminary sequence of bits based on the secure shares being combined. For example, as illustrated in FIG. 10B, when combining first secure share 1004-1 with third secure share 1004-3, preliminary subset 1020 comprises the outside four bits of preliminary sequence of bits 1016 and is combined with the middle four bits of preliminary sequence of bits 1016 to produce intermediate sequence of bits 1012. As another example, as illustrated in FIG. 10C, when combining second secure share 1004-2 with third secure share 1004-3, preliminary subset 1020 comprises the middle four bits pf preliminary sequence of bits 1016 and is combined with the outside four bits of preliminary sequence of bits 1016 to produce intermediate sequence of bits 1012.

In some embodiments, the subset of the preliminary sequence of bits is selected from the preliminary bits that are a result of an exclusive disjunction between a random bit, and a bit that is the exclusive disjunction between a random bit and a bit of user data. For example, assuming the secure shares were generated as described above in relation to FIG. 9, the first bit of first secure share 1004-1 is the first bit of random byte 920, and the first bit of third secure share 1004-3 is the result of the exclusive disjunction between bit 908-4 at index 4 and the first bit of random byte 920. The result of the exclusive disjunction between the first bit of first secure share 1004-1 and the first bit of third secure share 1004-3 when then result in canceling out the original exclusive disjunction of bit 908-4 with the random bit, and thus reproduce bit 908-4. The reproduced bit 908-4 may then be combined with a preliminary bit that is the result of the exclusive disjunction between: a bit that is the result of the exclusive disjunction between original bit 908-4 and a random bit (e.g., the third bit of first secure share 1004-1); and the result of the exclusive disjunction between a different bit of user data (e.g., bit 908-0) and the random bit (e.g., the third bit of third secure share 1004-3). This preliminary bit would logically represent the exclusive disjunction between bit 908-4 and bit 908-0, and thus the exclusive disjunction between this preliminary bit and the reproduced bit 908-4 would result in canceling out the exclusive disjunction between 908-4 and bit 908-0, resulting in reproduced bit 908-0.

In some embodiments, after generating the secure shares, each secure share may be dispersed to various locations for secure storage. For example, each secure share may be dispersed to discrete commercial cloud storage server systems. As another example, each secure share may be dispersed to various trusted individuals for storage. In some embodiments, the secure shares may be dispersed as digital data. For example, each secure share may be dispersed as a standalone binary file. In some embodiments, the secure shares are encoded and dispersed through other media, as described further in relation to FIGS. 11 and 12.

Figure 11:
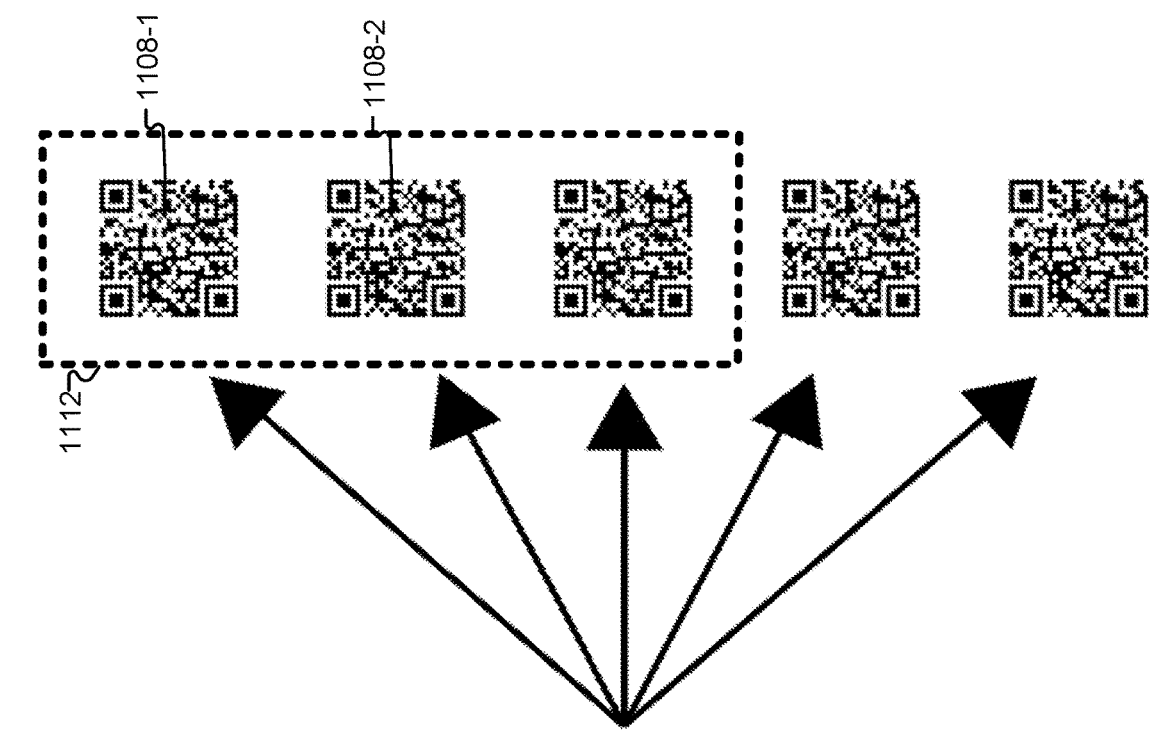
FIG. 11 illustrates an example dispersal of secret shares encoded as graphical indicators, according to some embodiments.
Figure 11:
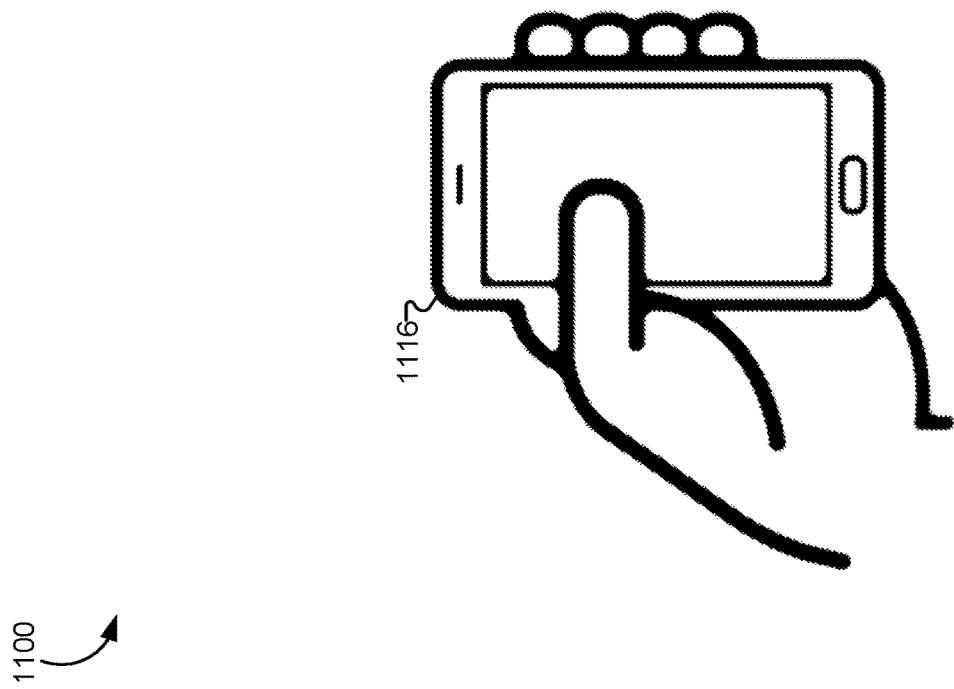

FIG. 11 illustrates an example dispersal 1100 of secret shares encoded as graphical indicators 1108, according to some embodiments. Dispersal 1100 of the secure shares may include encoding each secure share in a graphical indicator. For example, graphical indicators 1108 may be quick response (QR) codes or any similarly suitable graphical data matrix barcode. As another example, graphical indicators 1108 may be encoded images readable through various image recognition software, but may not otherwise appear to include any encoded data. In some embodiments, graphical indicators are dispersed as digital data. For example, graphical indicators 1108 may be digital representations of QR codes, image files, or digital passes that can be added to a mobile device passbook. As another example, graphical indicators 1108 may be a printed in hard copy and the digital versions deleted to further reduce the possibility of a secure share being accessible to an unauthorized user. As illustrated in FIG. 11, as many graphical indicators 1108 as secure shares may be created. In some embodiments, the graphical indicators may further be encoded with an identifier indicating the secure share that is encoded therein. For example, graphical indicator 1108-1 may be encoded with an identifier indicating a first secure share is encoded therein while graphical indicator 1108-2 may be encoded with a separate identifier indicating a second secure share is encoded therein.

In some embodiments, the secret user data may be reassembled from the graphical indicators. For example, mobile device 1116 operating a software application may be used to scan and/or read graphical indicators 1108. As another example, graphical indicators may be scanned separately and uploaded to a software application running on a mobile device and/or a personal computer. As illustrated in FIG. 11, while each secure share may be encoded in a separate graphical indicator 1108, a user may only need to scan the minimum threshold number of graphical indicators 1112 in order to reassemble the secret user data.

Figure 12:
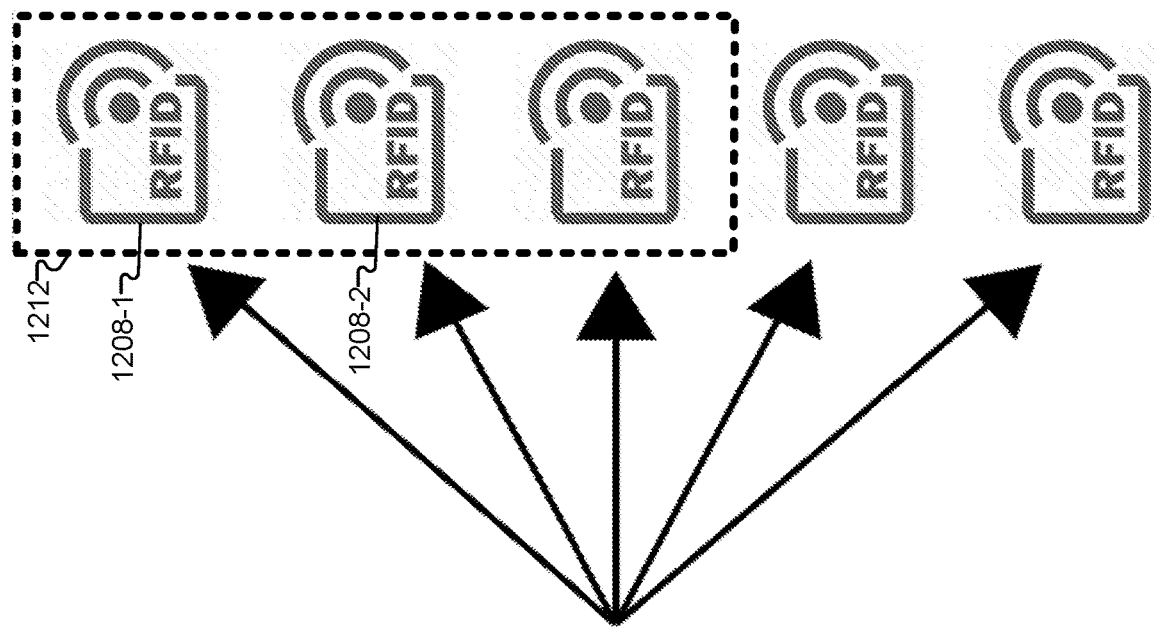
FIG. 12 illustrates an example dispersal of secret shares encoded in electronic components, according to some embodiments.
Figure 12:
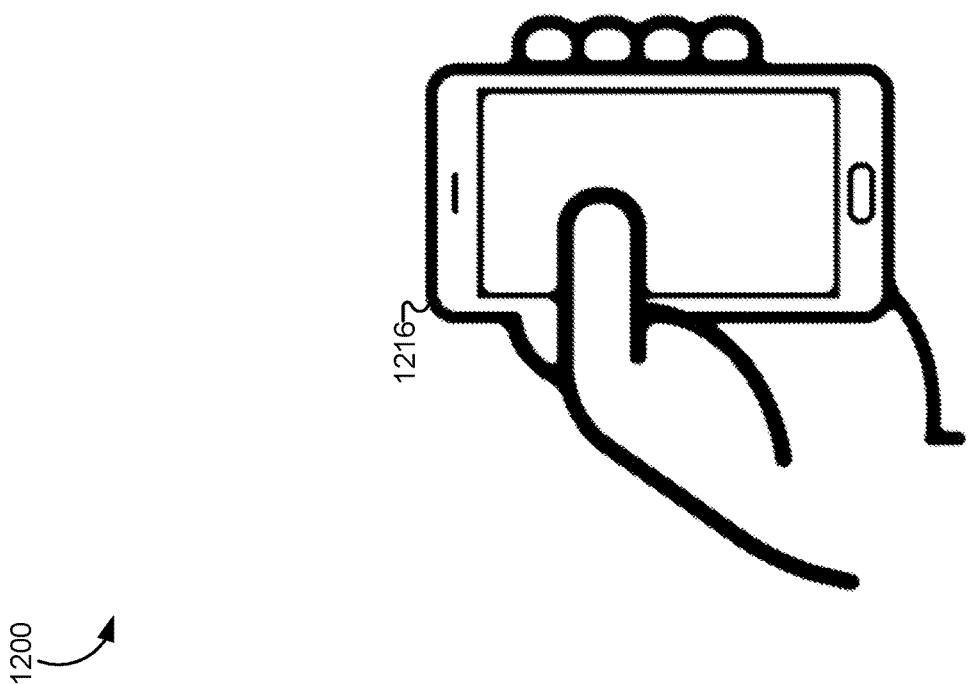

FIG. 12 illustrates an example dispersal of secret shares encoded in electronic components, according to some embodiments. Dispersal 1200 of the secure shares may include encoding each secure share in an electronic component. For example, electronic component 1208 may be a radio-frequency identification (RFID) tag. As another example, electronic component 1208 may be a near-field communication (NFC) tag. In some embodiments, electronic components may be encoded with the secure shares using a mobile device or personal computer. For example, mobile device may use a built in NFC reader/writer to encode each of electronic components 1208, such as NFC tags, with respective secure shares. As another example, a personal computer or mobile device may be connected to an external device capable of encoding electronic components 1208, such as RFID tags, with the respective secure shares.

In some embodiments, the electronic indicators are further be encoded with an identifier indicating the secure share that is encoded therein. For example, electronic indicator 1208-1 may be encoded with an identifier indicating a first secure share is encoded therein while electronic indicator 1208-2 may be encoded with a separate identifier indicating a second secure share is encoded therein. In some embodiments, the electronic indicators include a physical marking or other identification indicating which secure share has been encoded therein.

In some embodiments, the secret user data may be reassembled from the electronic indicators. For example, mobile device 1216 operating a software application may be used to scan and/or read electronic indicators 1208. As another example, electronic indicators may be read using an external reading device connected to mobile device 1216 or any similar computing device, such as a personal computer. As illustrated in FIG. 12, while each secure share may be encoded in a separate electronic indicator 1208, a user may only need to scan and/or have access to the minimum threshold number of electronic indicators 1212 in order to reassemble the secret user data.

Figure 13:
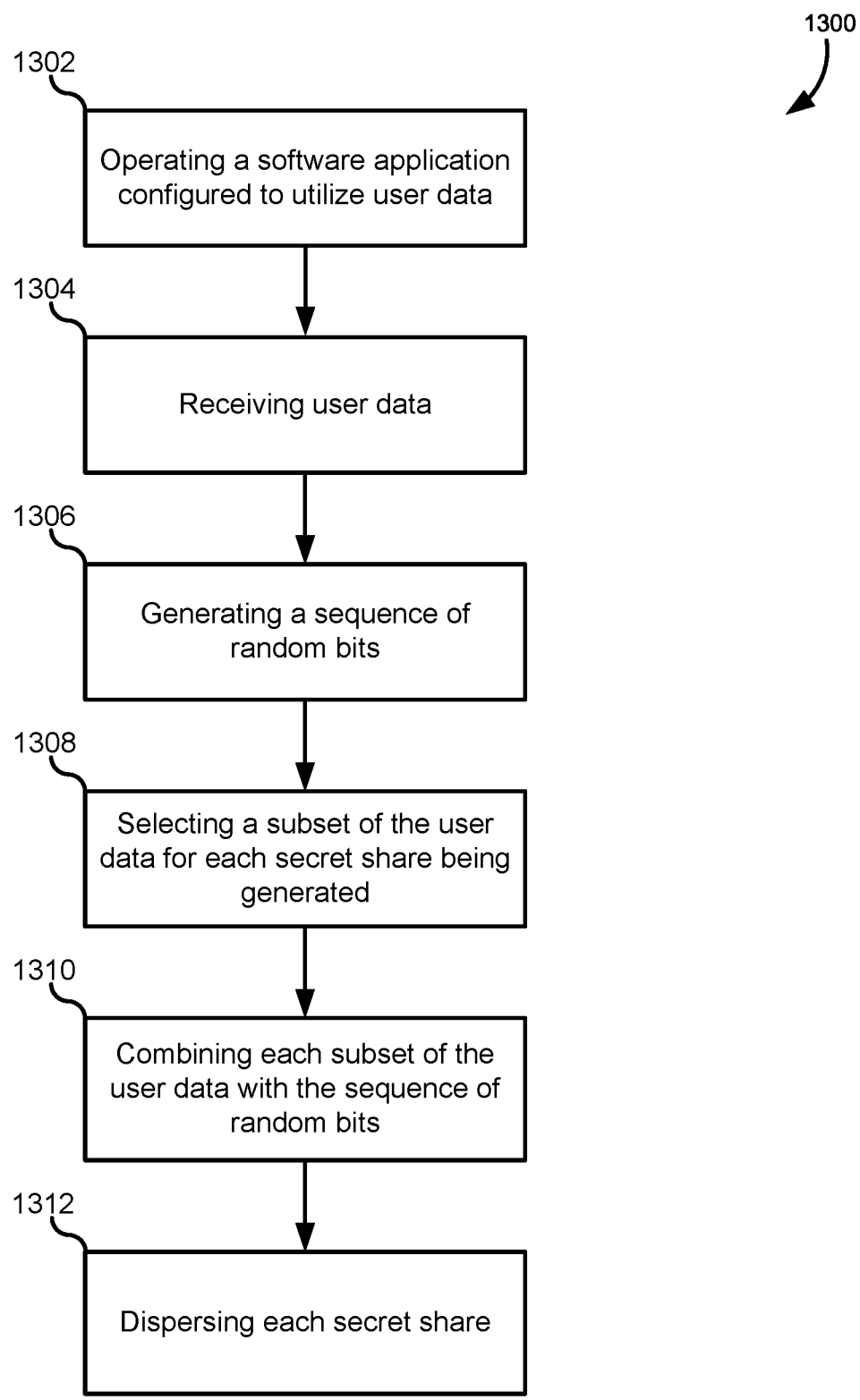
FIG. 13 illustrates a flowchart of a method for securely dispersing user data using an information dispersal algorithm, according to some embodiments.

FIG. 13 illustrates a flowchart 1300 of a method for securely dispersing user data using an information dispersal algorithm, according to some embodiments. The method may include operating a software application that can utilize user data (1302). The software application may include the service provider process described above. The software application may also include a secret sharing app configured to run on a user's mobile device or other computing device. In some embodiments, the software application may not have access to the internet. For example, the software application may prompt a user to disconnect their device from the internet to reduce the risk of any data being transmitted from the device before it has been securely encrypted and dispersed into secure shares. The software application may be run by the user device described above. The user data may include any data that is generated by a user, or generated automatically to describe user behavior. For example, the user data may include text, images, browsing history, passwords, bank account numbers, personal identifying information, and/or any similar information a person may desire to keep secure.

The method may also include receiving the user data (1304). In some embodiments, a user provides the user data to the software application. For example, the software application may have access to the user data through a file system, and a user my browse and select the user data. As another example, a user may upload the user data from a separate secure location, such as an external hard drive. In yet another example, a user may manually enter the user data, such as text, into a user data field of a graphical user interface. In some embodiments, the user data is represented as a sequence of bits comprising a plurality of bytes. For example, as described above, text, images, movies, and/or software may be converted into a binary sequence of bits.

The method may additionally include generating a sequence of random bits (1306). In some embodiments, the software application may generate a sequence of random bits. For example, the software application may be configured with a random number generator as described above. In some embodiments, the software application receives the sequence of random bits from an external source. For example, the software application may receive a sequence of random bits from an external hardware random number generator or true random number generator. In some embodiments, the length of the sequence of random bits is based on the user data. For example, the software application may determine that the user data is represented by a first number of bits and generate a sequence of random bits with at least as many random bits as the first number of bits.

In some embodiments, the method includes applying one or more security measures to the user data. After receiving the user data, it may be encrypted using an end to end mechanism. For example, the user data may be encrypted using the AES-256-CBC algorithm, as described above in relation to FIG. 6. In some embodiments, the method includes transforming the user data using an all-or-nothing transform. For example, an AES all-or-nothing transform based on AES-CTR-256 with SHA-256 accumulator may be applied to the encrypted user data, as described in FIG. 7.

In some embodiments, the method includes dispersing the user data into a plurality of secret shares. As described above, the number of secret shares of the plurality of secret shares may be any number. In some embodiments, the number of shares is set by the software application. For example, the software application may default to a total of three secret shares. As another example, the software may receive an input from a user indicating the desired number of secret shares. In some embodiments, the user data may be reassembled from a minimum threshold number of the total number of secret shares generated. For example, if the user data was dispersed into 5 secret shares, the minimum threshold number of shares may be 3 secret shares. In this case, any 3 secret shares of the original 5 shares may be used to reassemble the user data. In some embodiments, the minimum threshold number of shares is set by the software application before the user data is dispersed into secret shares. For example, the software application may default to a minimum threshold of 2 secret shares out of three total secret shares. As another example, the software may receive an input from a user indicating the desired threshold number of secret shares required to reassemble the user data.

The method may also include selecting a subset of the user data for each secret share being generated (1308). As described above, selecting a subset of the user data may include selecting a subset of bits from each byte of the user data based on the secret share being generated. In some embodiments, the selected subset of bits is the same for each byte of user data for each secure share. For example, the subset of bits for a first secure share may be a first, second, third, and fourth bit of each byte of the user data, the subset of bits for a second secure share may be a fifth, sixth, seventh, and eighth bit of each byte of the user data, and the subset of bits for a third secure share may be the first, second, fifth, sixth, seventh, eighth, third, and fourth bits as selected for the first and second shares, as described above in relation to FIG. 9.

The method may also include combining each subset of the user data with the sequence of random bits (1310). As described above, each subset of bits from each byte of the user data may be combined with a byte of the sequence of random bits. In some embodiments, combining the subset of bits with the byte of the sequence of random bits includes determining the result of the exclusive disjunction between the subset of bits and the byte of the sequence of random bits. In some embodiments, the subset of bits are combined with particular bits of the byte of random bits based on the secret share being generated. For example, the subset of bits may be combined with the middle four bits of the byte of random bits for a first secret share, the subset of bits may be combined with the outside four bits of the byte of random bite for a second secret share, and the subset of bits may be combined with the entire byte of random bits for a third secret share, as described above in relation to FIG. 9.

The method may also include dispersing each secret share (1312). In some embodiments, dispersing each secret share includes concatenating an authentication code to the secret share. For example, a hash-based message authentication code (HMAC) according to SHA-256 may be concatenated with each share, as described above in relation to FIG. 8. In some embodiments, each secret share is dispersed for storage in various locations. For example, each secret share may be dispersed to an independent secure data repository, as described above in relation to FIG. 4. In some embodiments, each secret share is encoded in a graphical and/or electronic indicator. For example, each secret share may be encoded in a barcode or data matrix, such as a stacked linear two dimensional barcode (e.g., PDF417) or a QR code, as described above in relation to FIG. 11. As another example, each secret share may be encoded in an electronic indicator, such as an RFID or NFC tax, as described above in relation to FIG. 12.

The method may also include reassembling the user data from the dispersed shares. In some embodiments, a subset of the dispersed shares may be combined to generate the user data. For example, out of three dispersed shares, a first share may be combined with a second or third share to reproduce the user data, as described above in relation to FIGS. 10A-10C. In some embodiments, combining dispersed shares includes determining the result of the exclusive disjunction between the shares.

The method described herein may be implemented by a computer system. Each step of the method may be executed automatically by the computer system, and/or may be provided with inputs/outputs involving a user. For example, a user may provide inputs for each step in the method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the method described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 14:
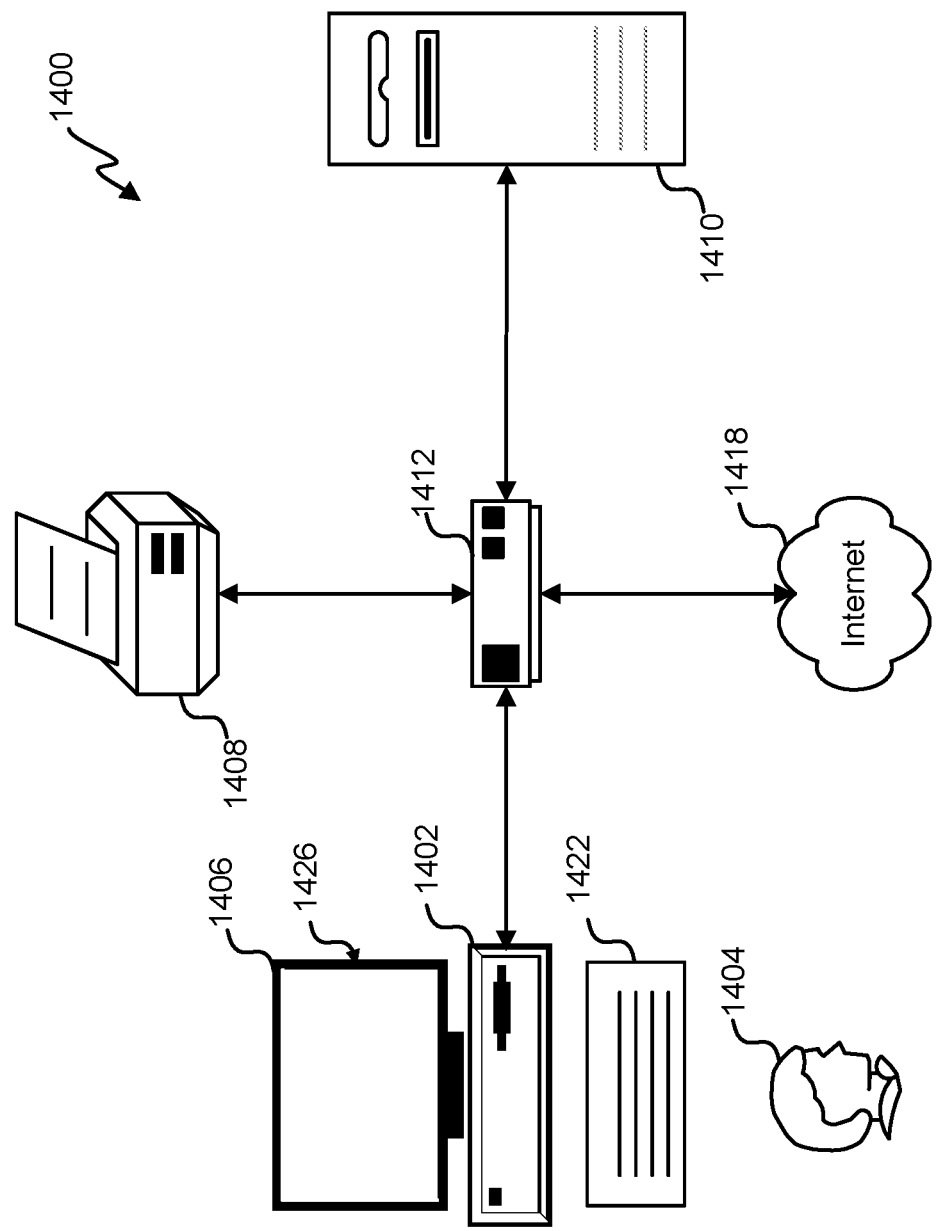
FIG. 14 illustrates an exemplary environment in which embodiments may be implemented, according to some embodiments.

FIG. 14 illustrates an exemplary environment 1400 in which embodiments may be implemented, according to some embodiments. Embodiments may be implemented in a computer system 1400 that can be used by a designer 1404 to design, for example, electronic designs. The computer system 1410 can include a computer 1402, an optional keyboard 1422, a network router 1412 or other routing fabric, an optional printer 1408, and an optional monitor 1406. The monitor 1406, processor 1402 and keyboard 1422 are part of a computer system 1426, which can be a laptop computer, desktop computer, handheld computer, rack-mounted computer, mainframe computer, etc. The monitor 1406 can be a CRT, flat screen, remote terminal, etc.

A designer 1404 can input commands into the computer 1402 using various input devices, such as a mouse, keyboard 1422, track ball, touch screen, etc. If the computer system 1400 comprises a mainframe, a designer 1404 can access the computer 1402 using, for example, a terminal or terminal interface. Additionally, the computer system 1426 may be connected to a printer 1408 and a server 1410 using a network router 1412, which may connect to the Internet 1418 or a WAN.

The server 1410 may, for example, be used to store additional software programs and data. In one embodiment, software implementing the systems and methods described herein can be stored on a storage medium in the server 1410. Thus, the software can be run from the storage medium in the server 1410. In another embodiment, software implementing the systems and methods described herein can be stored on a storage medium in the computer 1402. Thus, the software can be run from the storage medium in the computer system 1426. Therefore, in this embodiment, the software can be used whether or not computer 1402 is connected to network router 1412. Printer 1408 may be connected directly to computer 1402, in which case, the computer system 1426 can print whether or not it is connected to network router 1412.

Figure 15:
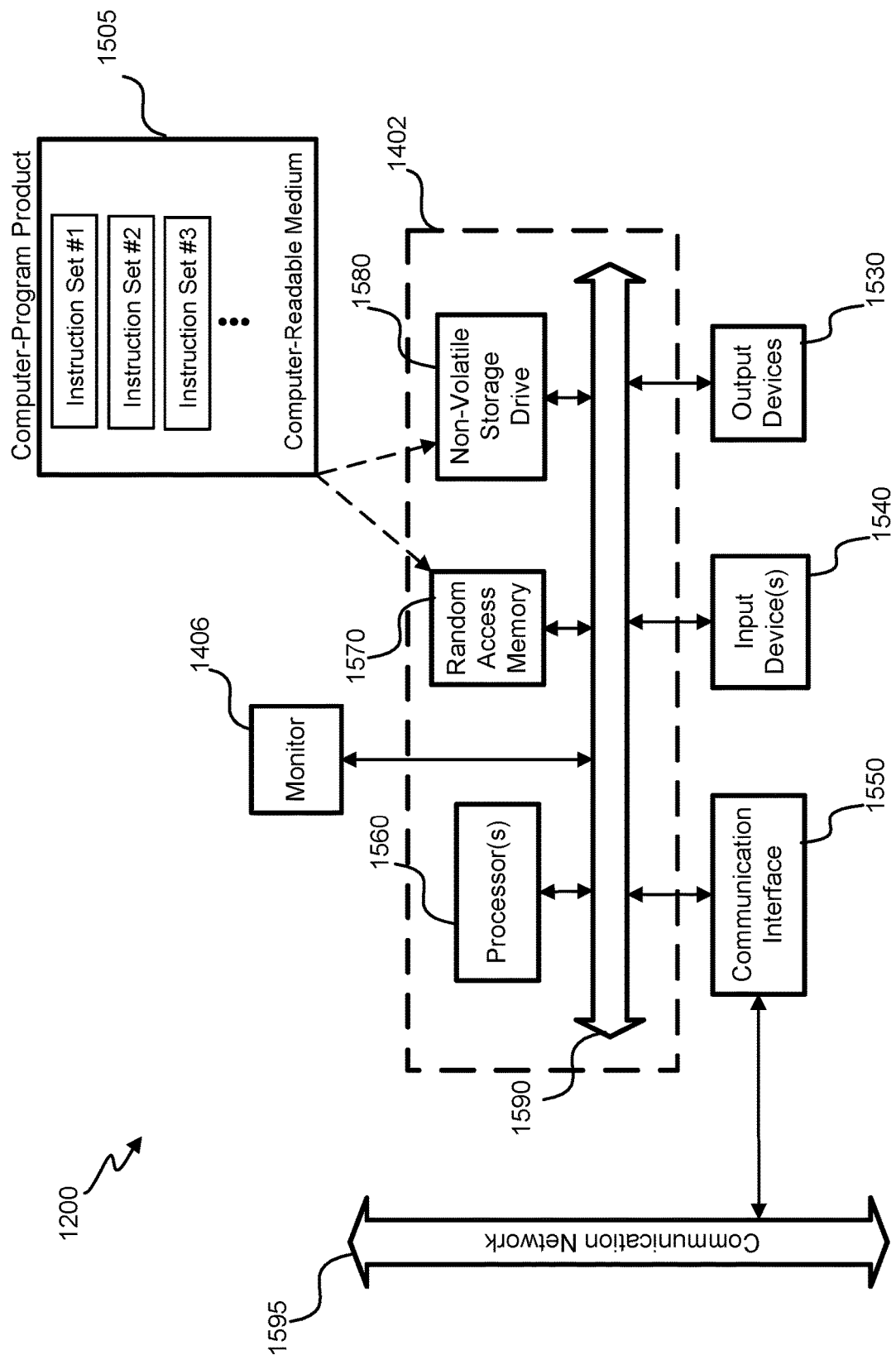
FIG. 15 illustrates an embodiment of a special-purpose host computer system, according to some embodiments.

FIG. 15 illustrates an embodiment of a special-purpose host computer system 1500, according to some embodiments. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1426, it is transformed into the special-purpose host computer system 1500.

Special-purpose host computer system 1500 comprises a computer 1402, a monitor 1406 coupled to computer 1402, one or more additional user output devices 1530 (optional) coupled to computer 1402, one or more user input devices 1540 (e.g., keyboard, mouse, track ball, touch screen) coupled to computer 1402, an optional communications interface 1550 coupled to computer 1402, a computer-program product 1505 stored in a tangible computer-readable memory in computer 1402. Computer-program product 1505 directs host computer system 1400 to perform the above-described methods. Computer 1402 may include one or more processors 1560 that communicate with a number of peripheral devices via a bus subsystem 1590. These peripheral devices may include user output device(s) 1530, user input device(s) 1540, communications interface 1550, and a storage subsystem, such as random access memory (RAM) 1570 and non-volatile storage drive 1580 (e.g., disk drive, optical drive, solid state drive), which are forms of tangible computer-readable memory.

Computer-program product 1505 may be stored in non-volatile storage drive 1580 or another computer-readable medium accessible to computer 1402 and loaded into memory 1570. Each processor 1560 may comprise a microprocessor, such as a microprocessor from Intel® or Advanced Micro Devices, Inc.®, or the like. To support computer-program product 1505, the computer 1402 runs an operating system that handles the communications of product 1505 with the above-noted components, as well as the communications between the above-noted components in support of the computer-program product 1505. Exemplary operating systems include Windows® or the like from Microsoft® Corporation, Solaris® from Oracle®, LINUX, UNIX, and the like.

User input devices 1540 include all possible types of devices and mechanisms to input information to computer system 1402. These may include a keyboard, a keypad, a mouse, a scanner, a digital drawing pad, a touch screen incorporated into the display, audio input devices such as voice recognition systems, microphones, and other types of input devices. In various embodiments, user input devices 1540 are typically embodied as a computer mouse, a trackball, a track pad, a joystick, wireless remote, a drawing tablet, a voice command system. User input devices 1540 typically allow a user to select objects, icons, text and the like that appear on the monitor 1406 via a command such as a click of a button or the like. User output devices 1530 include all possible types of devices and mechanisms to output information from computer 1402. These may include a display (e.g., monitor 1406), printers, non-visual displays such as audio output devices, etc.

Communications interface 1550 provides an interface to other communication networks and devices and may serve as an interface to receive data from and transmit data to other systems, WANs and/or the Internet 1418. Embodiments of communications interface 1550 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1550 may be coupled to a computer network, to a FireWire® bus, or the like. In other embodiments, communications interface 1550 may be physically integrated on the motherboard of computer 1402, and/or may be a software program, or the like.

RAM 1570 and non-volatile storage drive 1580 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1570 and non-volatile storage drive 1580 may be configured to store the basic programming and data constructs that provide the functionality of various embodiments of the present invention, as described above.

Software instruction sets that provide the functionality of the present invention may be stored in RAM 1570 and non-volatile storage drive 1580. These instruction sets or code may be executed by the processor(s) 1560. RAM 1570 and non-volatile storage drive 1580 may also provide a repository to store data and data structures used in accordance with the present invention. RAM 1570 and non-volatile storage drive 1580 may include a number of memories including a main random access memory (RAM) to store of instructions and data during program execution and a read-only memory (ROM) in which fixed instructions are stored. RAM 1570 and non-volatile storage drive 1580 may include a file storage subsystem providing persistent (non-volatile) storage of program and/or data files. RAM 1570 and non-volatile storage drive 1580 may also include removable storage systems, such as removable flash memory.

Bus subsystem 1590 provides a mechanism to allow the various components and subsystems of computer 1402 communicate with each other as intended. Although bus subsystem 1590 is shown schematically as a single bus, alternative embodiments of the bus subsystem may utilize multiple busses or communication paths within the computer 1402.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of securely dispersing private user data into secret shares, the method comprising:
  operating, by a computing device, a software application configured to utilize user data;
  receiving, by the computing device, the user data, the user data comprising a plurality of bytes;
  generating, by the computing device, a sequence of random bits;
  generating, by the computing device, a plurality of secret shares from the user data, the plurality of secret shares comprising a first secret share, a second secret share, and a third secret share, wherein generating each of the plurality of secret shares comprises:
    selecting, by the computing device, a subset of bits from each byte of the plurality of bytes based on the secret share being generated, thereby creating a subset of the user data, the selected subset of bits being the same for each byte of the plurality of bytes, wherein selecting the subset of bits from each byte of the plurality of bytes comprises:
      selecting, for the first secret share, a first bit, a second bit, a third bit, and a fourth bit;
      selecting, for the second secret share, a fifth bit, a sixth bit, a seventh bit, and an eighth bit; and
      selecting, for the third secret share, the first bit, the second bit, the fifth bit, the sixth bit, the seventh bit, the eighth bit, the third bit, and the fourth bit; and
    combining, by the computing device, the subset of the user data with the sequence of random bits; and
  dispersing, by the computing device, each secret share of the plurality of secret shares.

2. The method of claim 1, wherein:
  each byte of 8 bits is indexed from 0 to 7;
  the first bit is the bit at index 4;
  the second bit is the bit at index 1;
  the third bit is the bit at index 6;
  the fourth bit is the bit at index 3;
  the fifth bit is the bit at index 0;
  the sixth bit is the bit at index 5;
  the seventh bit is the bit at index 2; and
  the eighth bit is the bit at index 7.

3. The method of claim 2, wherein combining the subset of the user data with the sequence of random bits comprises:
  selecting, for each byte of the user data, a byte of the sequence of random bits, each byte of the sequence of random bits having a middle four bits and an outside four bits that do not overlap; and
  generating an output byte, wherein generating the output byte comprises:

determining, for the first secret share, the result of the exclusive disjunction between the subset of bits and the middle four bits of the byte of the sequence of random bits;

determining, for the second secret share, the result of the exclusive disjunction between the subset of bits and the outside four bits of the byte of the sequence of random bits; and determining for the third secret share, the result of the exclusive disjunction between the subset of bits and the byte of the sequence of random bits.

4. The method of claim 1, wherein generating the sequence of random bits comprises:

determining that the user data is represented by a first number of bits; and generating a second number of random bits, the second number of random bits being greater than or equal to the first number of bits.

5. The method of claim 1, wherein a minimum number of secret shares is required to reassemble the user data, the minimum number of secret shares being less than the generated plurality of secret shares and more than one secret share.

6. The method of claim 5, wherein the plurality of secret shares comprises three secret shares and the minimum number of secret shares comprises two secret shares.

7. The method of claim 5, wherein the plurality of secret shares is based on a first input received by the computing device and the minimum number of secret shares is based on a second input received by the computing device.

8. The method of claim 1, further comprising generating, by the computing device, the user data using a subset of the generated plurality of secret shares.

9. The method of claim 8, wherein generating the user data comprises:

combining the first secret share with the second secret share;

combining the first secret share with the third secret share; or combining the second secret share with the third secret share.

10. The method of claim 9, wherein: combining the first secret share with the second secret share comprises:

generating, from the exclusive disjunction between the first secret share and the second secret share, an intermediate sequence of bits, the intermediate sequence of bits comprising bytes of bits indexed from 0 to 7; and generating, for each byte of the intermediate sequence of bits, a restored byte such that the intermediate bit at index 0 of the byte is at index 0 of the restored byte, the intermediate bit at index 3 of the byte is at index 1 of the restored byte, the intermediate bit at index 6 of the byte is at index 2 of the restored byte, the intermediate bit at index 5 of the byte is at index 3 of the restored byte, the intermediate bit at index 2 of the byte is at index 4 of the restored byte, the intermediate bit at index 1 of the byte is at index 5 of the restored byte, the intermediate bit at index 4 of the byte is at index 6 of the restored byte, and the intermediate bit at index 7 of the byte is at index 7 of the restored byte; combining the first secret share with the third secret share comprises:

generating, from the exclusive disjunction between the first secret share and the third secret share, a first preliminary sequence of bits, the first preliminary sequence of bits comprising bytes of bits indexed from 0 to 7;

generating, a second preliminary sequence of bits, wherein the second preliminary sequence of bits comprises a zero at indexes 0 through 1 and 6 through 7, the bits at indexes 0 through 1 of the first preliminary sequence of bits at indexes 2 through 3 respectively, and the bits at indexes 6 through 7 of the first preliminary sequence of bits at indexes 4 through 5 respectively;

generating, from the exclusive disjunction between the first preliminary sequence of bits and the second preliminary sequence of bits, an intermediate sequence of bits, the intermediate sequence of bits indexed from 0 to 7; and generating, for each byte of the intermediate sequence of bits, a restored byte such that the intermediate bit at index 2 of the byte is at index 0 of the restored byte, the intermediate bit at index 1 of the byte is at index 1 of the restored byte, the intermediate bit at index 4 of the byte is at index 2 of the restored byte, the intermediate bit at index 7 of the byte is at index 3 of the restored byte, the intermediate bit at index 0 of the byte is at index 4 of the restored byte, the intermediate bit at index 3 of the byte is at index 5 of the restored byte, the intermediate bit at index 6 of the byte is at index 6 of the restored byte, and the intermediate bit at index 5 of the byte is at index 7 of the restored byte; and combining the second secret share with the third secret share comprises:

generating, from the exclusive disjunction between the second secret share and the third secret share, a first preliminary sequence of bits, the first preliminary sequence of bits comprising bytes of bits indexed from 0 to 7;

generating, a second preliminary sequence of bits, wherein the second preliminary sequence of bits comprises a zero at indexes 2 through 5 of each byte, and the bits at indexes 2 through 5 of each byte of the first preliminary sequence of bits at indexes 0 through 1 and 6 through 7 respectively;

generating, from the exclusive disjunction between the first preliminary sequence of bits and the second preliminary sequence of bits, an intermediate sequence of bits, the intermediate sequence of bits indexed from 0 to 7; and generating, for each byte of the intermediate sequence of bits, a restored byte such that the intermediate bit at index 2 of the byte is at index 0 of the restored byte, the intermediate bit at index 1 of the byte is at index 1 of the restored byte, the intermediate bit at index 4 of the byte is at index 2 of the restored byte, the intermediate bit at index 7 of the byte is at index 3 of the restored byte, the intermediate bit at index 0 of the byte is at index 4 of the restored byte, the intermediate bit at index 3 of the byte is at index 5 of the restored byte, the intermediate bit at index 6 of the byte is at index 6 of the restored byte, and the intermediate bit at index 5 of the byte is at index 7 of the restored byte.

11. The method of claim 1, further comprising encrypting, after receiving the user data and before generating the plurality of secret shares, the user data using an end-to-end encryption mechanism.

12. The method of claim 11, further comprising performing, after encrypting the user data and before generating the plurality of secret shares, an all-or-nothing transform on the encrypted user data.

13. The method of claim 1, further comprising concatenating, after generating the plurality of secret shares, an authentication code to each secret share of the generated plurality of secret shares.

14. The method of claim 1, wherein dispersing the plurality of secret shares comprises generating a QR code for each secret share of the generated plurality of secret shares, the QR code comprising the secret share.

15. The method of claim 1, wherein dispersing the plurality of secret shares comprises encoding an RFID tag for each secret share of the generated plurality of secret shares, the RFID tag comprising the secret share.

16. A non-transitory, computer-readable medium comprising instructions that, when executed by one or more processors, causes the one or more processors to perform operations comprising:
   operating a software application configured to utilize user data;
   receiving the user data;
   generating a sequence of random bits;
   generating a plurality of secret shares from the user data, the plurality of secret shares comprising a first secret share, a second secret share, and a third secret share, wherein generating each of the plurality of secret shares comprises:
      selecting a subset of the user data based on the secret share being generated, wherein selecting the subset of the user data comprises:
         selecting, for the first secret share, a first half of the user data;
         selecting, for the second secret share, a second half of the user data; and
         selecting, for the third secret share, all of the user data; and
      combining the subset of the user data with the sequence of random bits; and
   dispersing each secret share of the plurality of secret shares.

17. The non-transitory computer-readable medium according to claim 16, wherein:
   the user data comprises a plurality of bytes, wherein each byte of 8 bits is indexed from 0 to 7; and
   selecting a subset of the user data further comprises selecting a subset of bits from each byte of the plurality of bytes, the selected subset of bits being the same for each byte of the plurality of bytes, wherein selecting the subset of bits from each byte of the plurality of bytes comprises:
      selecting, for the first secret share, the bit at index 4, the bit at index 1, the bit at index 6, and the bit at index 3, in that order;
      selecting, for the second secret share, the bit at index 0, the bit at index 5, the bit at index 2, and the bit at index 7, in that order; and
      selecting, for the third secret share, the bit at index 4, the bit at index 1, the bit at index 0, the bit at index 5, the bit at index 2, the bit at index 7, the bit at index 6, and the bit at index 3, in that order.

18. The non-transitory computer-readable medium according to claim 17, wherein combining the subset of the user data with the sequence of random bits comprises:
   selecting, for each byte of the user data, a byte of the sequence of random bits, each random bit of the byte of the sequence of random bits being indexed from 0 to 7; and
   generating an output byte, wherein generating the output byte comprises:
      determining, for the first secret share, the result of the exclusive disjunction between the subset of bits and the random bits at indexes 2 through 5;
      determining, for the second secret share, the result of the exclusive disjunction between the subset of bits and the random bits at indexes 0 through 1 and 6 through 7; and
      determining for the third secret share, the result of the exclusive disjunction between the subset of bits and the random bits.

19. The non-transitory computer-readable medium according to claim 16, wherein dispersing each secret share comprises generating a QR code for each secret share of the generated plurality of secret shares, the QR code comprising the secret share.

20. A method of securely dispersing private user data into secret shares, the method comprising:
   operating, by a computing device, a software application configured to utilize user data;
   receiving, by the computing device, the user data;
   obtaining, by the computing device, a sequence of random bits;
   generating, by the computing device, a plurality of secret shares from the user data, the plurality of secret shares comprising a first secret share, a second secret share, and a third secret share, wherein generating each of the plurality of secret shares comprises:
      selecting, by the computing device, a subset of the user data based on the secret share being generated, wherein selecting the subset of the user data comprises:
         selecting, for the first secret share, a first half of the user data;
         selecting, for the second secret share, a second half of the user data; and
         selecting, for the third secret share, all of the user data; and
      combining, by the computing device, the subset of the user data with the sequence of random bits; and
   generating, by the computing device, a QR code for each secret share of the generated plurality of secret shares, the QR code comprising the secret share.

* * * * *